March 29, 1966     R. W. BRUNDAGE     3,242,703
HYDRAULIC LAUNDRY MACHINE TRANSMISSION
Filed Aug. 22, 1963     8 Sheets-Sheet 1

INVENTOR.
ROBERT W. BRUNDAGE
BY Tillbury & Body
ATTORNEYS

March 29, 1966 R. W. BRUNDAGE 3,242,703
HYDRAULIC LAUNDRY MACHINE TRANSMISSION
Filed Aug. 22, 1963 8 Sheets-Sheet 2

INVENTOR.
ROBERT W. BRUNDAGE
BY
Tillbury & Body
ATTORNEYS

March 29, 1966 R. W. BRUNDAGE 3,242,703
HYDRAULIC LAUNDRY MACHINE TRANSMISSION
Filed Aug. 22, 1963 8 Sheets-Sheet 3

INVENTOR.
ROBERT W. BRUNDAGE
BY
ATTORNEYS

March 29, 1966  R. W. BRUNDAGE  3,242,703
HYDRAULIC LAUNDRY MACHINE TRANSMISSION
Filed Aug. 22, 1963  8 Sheets-Sheet 4

INVENTOR.
ROBERT W. BRUNDAGE
BY
Tilberry & Body
ATTORNEYS

INVENTOR.
ROBERT W. BRUNDAGE
BY
Tilbury & Body
ATTORNEYS

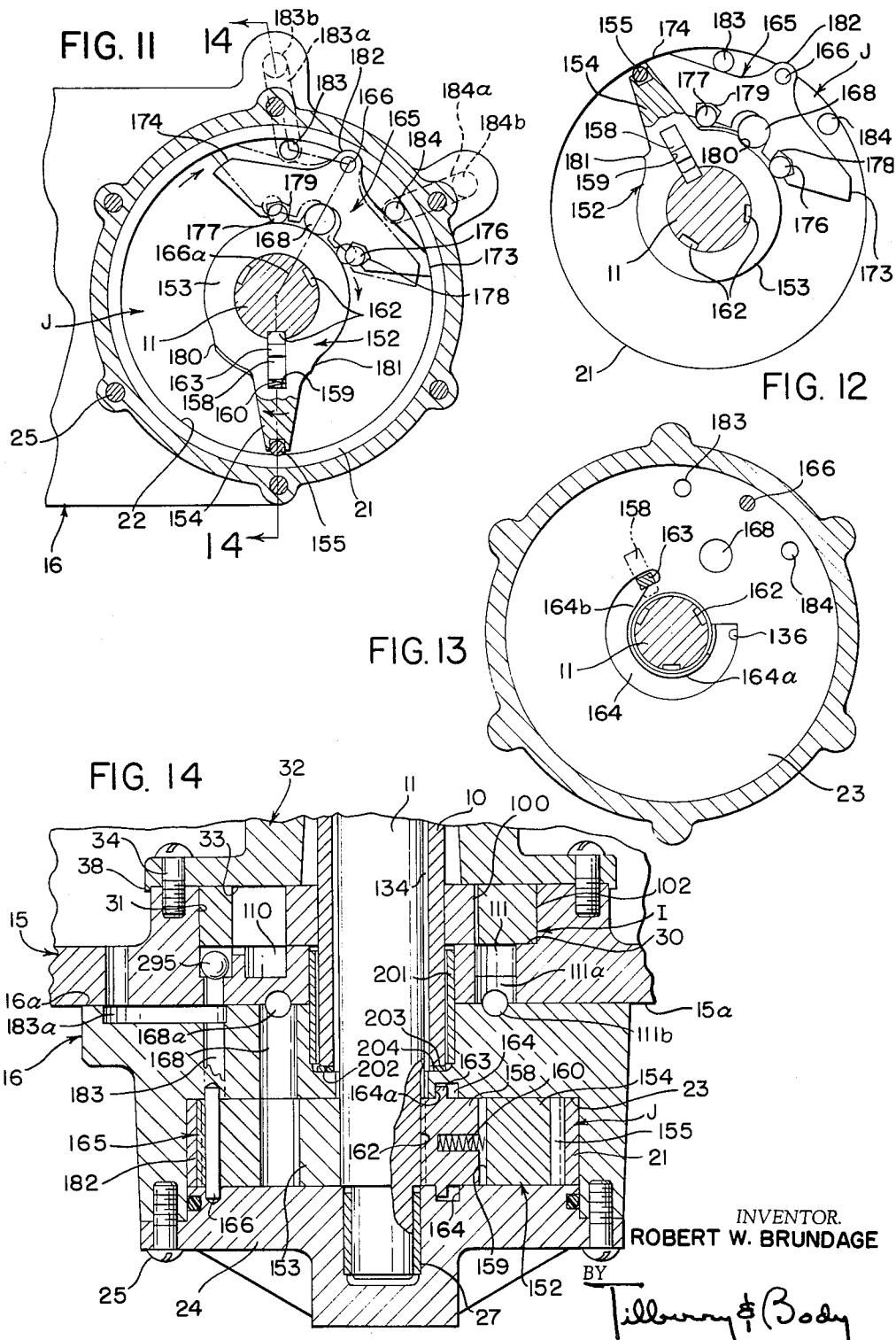

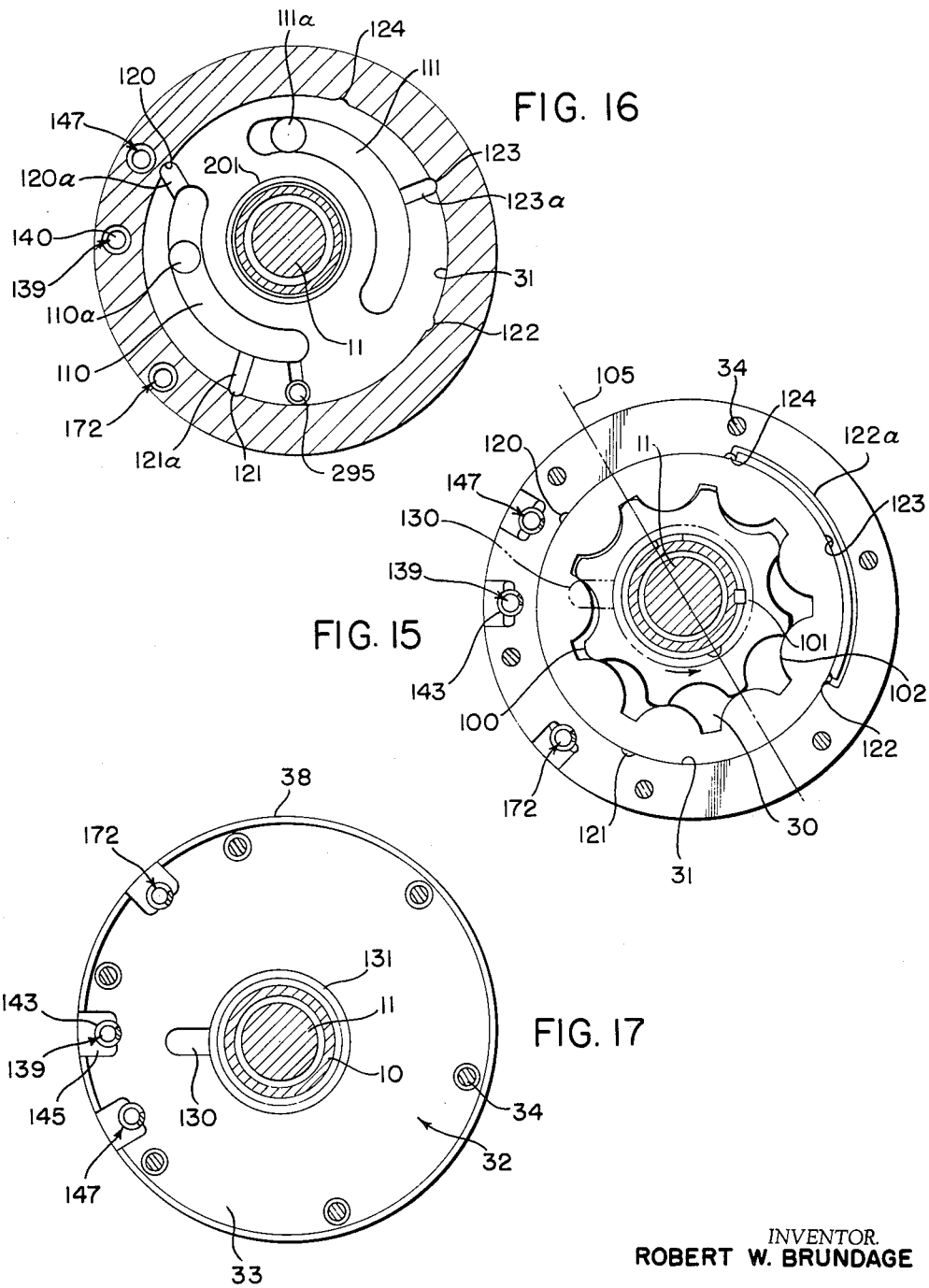

United States Patent Office 3,242,703
Patented Mar. 29, 1966

3,242,703
HYDRAULIC LAUNDRY MACHINE
TRANSMISSION
Robert W. Brundage, St. Louis, Mo., assignor to Emerson
Electric Co., a corporation of Missouri
Filed Aug. 22, 1963, Ser. No. 303,905
48 Claims. (Cl. 68—23)

This invention pertains to the art of hydraulic power transmissions, and more particularly to a hydraulic power transmission capable of changing rotary motion at one speed, selectively, to rotary motion at another speed, or to oscillatory rotary motion.

The invention is particularly applicable to a power transmission for laundry machines of the type which both agitates and spin dries the laundry and will be described with particular reference thereto, although it will be appreciated that the invention has other and broader applications.

BACKGROUND

Such laundry machines generally comprise a large tub fixed against rotation, a perforated basket within the tub, and an agitator within the basket. The tub holds water to a predetermined level, while the basket supports the clothes submerged in the water. The agitator is oscillated at somewhere between 20 and 100 oscillations per minute and moves the clothes through the water. After the clothes have been agitated a sufficient length of time, the water is pumped or allowed to drain out of the tub and the basket is then spun at speeds of between 50 and 800 r.p.m. to force the water out of the clothes by centrifugal action. The process or variations thereof may then be repeated for a number of cycles.

Such laundry machines have been normally powered by an electric motor rotating at a nominal speed of 1800 r.p.m. Belts, pulleys and/or multiple gear trains have been required to reduce the rotational speed of the motor to that of the spin speed of the basket. Additional speed reducing mechanism and crank arms have been required to reduce the speed still further to the oscillating speed of the agitator, and to change the rotational motion of the motor to the oscillating or reciprocating action required by the agitator. In addition to this, clutches, electrical solenoids to operate the clutches, brakes and electrical solenoids to operate the brakes have been required.

Such mechanical transmissions are expensive to manufacture, cumbersome in size, difficult to lubricate, wear out rapidly, become noisy and are difficult to maintain or repair.

Furthermore, unless the clutches are provided with a neutral position or are centrifugally operated, either of which is expensive, the motor is required to start under a heavy load, requiring the use of a more expensive motor rather than the less expensive low starting torque type of motor. Additionally, if variable speeds of oscillation of the agitator or of rotation of the basket, or both, are required, either an expensive multiple speed electric drive motor or an expensive variable speed power transmission is required.

The present invention contemplates a transmission which overcomes all of the above referred to difficulties and others, and provides a transmission particularly adaptable for laundry machines which is inexpensive to manufacture, is self-lubricated, requires a minimum of maintenance, enables a simple split-phase motor to be employed, is fully self-contained, and entirely automatic in operation.

SUMMARY OF INVENTION

In accordance with the present invention, a hydraulic transmission is provided particularly adapted for laundry machines comprised of a unitary housing containing a hydraulic pump, a rotating hydraulic motor, an oscillating hydraulic motor and valve means and passages within the housing selectively communicating the pump with either of the two motors.

Further in accordance with the invention, a hydraulic transmission is provided particularly adapted for laundry machines comprised of a housing containing a hydraulic pump and a hydraulic motor wherein the housing is made of at least two pieces having surfaces in abutting relationship, these surfaces being provided with recesses which intercommunicate the pump with the motor.

Further in accordance with the invention, a hydraulic transmission is provided particularly adapted for laundry machines comprised of a two-piece housing with each piece having a generally flat surface and in sealed abutting engagement with the surface of the other housing and the two housing members having formed therein all of the pump, motor and valve cavities as well as the passages intercommunicating the various cavities.

Further in accordance with the invention, a hydraulic transmission is provided comprised of a reversible motor driving a hydraulic pump and a pair of hydraulic motors adapted to be supplied with fluid under pressure from the pumps and valve means operable, preferably automatically, to communicate the outlet of the pump to either of the two motors upon reversal of direction of rotation of the pump drive motor.

Further in accordance with the invention, a hydraulic transmission is provided comprised of a hydraulic pump, an electric motor driving the pump, a hydraulic motor to be driven by the outlet of the pump and valve means for controlling the flow of fluid from the pump to the hydraulic motor, such valve means having a neutral position when the electric motor is not rotating which communicates the outlet of the pump to the inlet, such valve means being arranged to shift the communication of the outlet of the pump from the inlet of the hydraulic motor at least a predetermined appreciable time after the electric motor is energized and commences to rotate. In a preferred but limited aspect of this invention, the valve is arranged to shift automatically responsive to fluid flow from the pump. The predetermined appreciable time period should be that which will enable the electric motor to come up to at least 10% of its full load speed before the output of the pump is communicated 100% to the hydraulic motor. This time period may vary dependent upon the starting characteristics of the electric motor and the small amount of load imposed by the hydraulic pump when its outlet is connected to inlet.

Further in accordance with the invention, a hydraulic transmission is provided for a laundry machine of the general type described having an oscillating agitator coupled to an agitator motor, a spinnable basket connected to a hydraulic spin motor and valve means blocking the inlet to and outlet from the spin motor when the agitator motor is being supplied with hydraulic fluid under pressure.

Still further in accordance with the invention, once the spin basket is rotating and its rotation is to be stopped, valve means are so arranged as to resist the discharge of fluid from the spin motor in controlled amounts such that excessive hydraulic pressures are not developed and such that the spin basket is braked to a stop in a required time interval.

Further in accordance with the invention, the agitator motor is an oscillating type having a limited maximum arc of movement and the driving connection between this motor and the agitator is such as to be disconnected when the spin basket commences to be rotated. This arrangement may be either hydraulic, electrical or mechanical, but in preferred embodiments is in the form of a key on the motor shaft engaging a keyway in the agitator shaft which key is cammed out of engagement upon rotation of the agitator motor as a result of rotation of the spin basket.

Still further in accordance with the invention, the weight of the clothes in the spin basket is supported on a thrust bearing and the initial pressure supplied to the spin motor to start it rotating helps support the weight to lower the static friction in the thrust bearing.

In the course of developing the hydraulic transmission of this invention, it was found that the clothes and spin basket became effectively weightless as long as they were being spun in water at a speed substantially below that required to effectively spin dry the clothes. In effect, the spin basket and clothes were buoyed up in the water due to the spinning action. Once the water had drained from the tub and the buoyant effects had been dissipated, then the clothes and basket again had an apparent weight. Thus, in a further aspect of the invention, the spin basket is supported for upward vertical movement in limited amounts, means are provided for biasing the basket upwardly, and valve means responsive to vertical upward movement of the basket are provided for bleeding off fluid being supplied to the spin motor when the clothes and spin basket are in a weightless condition to limit the speed of rotation of the spin motor until such time as the water in the tub has been evacuated and the clothes and spin basket again have an effective weight greater than the bias, at which time the valve means are closed and all of the fluid is then supplied to the spin motor to increase its speed.

Stated otherwise, in accordance with the invention, means sensitive to the amount of water in the tub are provided for bleeding off some of the hydraulic fluid being supplied to the spin motor prior to the time that substantially all of the water has been removed from the tub.

Further in accordance with the invention, a hydraulic transmission of the general type described is provided comprised of a pair of hydraulic motors, a hydraulic pump, a reversible electric motor driving such pump in either of two directions, and valve means for selectively directing the output of the pump to either motor dependent on the direction of rotation, the pump having an adjustable output volume control member so arranged that for the same adjustment, the change of volume output will be different dependent on the direction of rotation of the pump so that the same adjustment produces a different ratio of speed variation of the two hydraulic motors.

In a somewhat more limited aspect, the manifold ports of the pump are adjustable circumferentially relative to the neutral axis of the pump so as to vary the pump output volume, with the manifold ports on each side of the axis being adjustable relative to pumping chambers having differing rates of volume change per degree of rotation such that the same circumferential adjustment of the ports produces one ratio of change in the output volume of the pump when the pump is rotating in one direction and a different ratio of change when rotating in the opposite direction. The ratio of maximum to minimum speeds of the two motors can thus be different.

OBJECTS

The principal object of the present invention is the provision of a new and improved hydraulic transmission particularly adapted, but not necessarily limited to, laundry machines of the type described which is simple in construction, inexpensive to manufacture and which will have a maximum life with a minimum of maintenance.

A further object of the present invention is the provision of a new and improved hydraulic transmission particularly adapted for laundry machines which never needs lubrication by maintenance personnel.

Another object of the invention is the provision of an integrated power transmission unit for laundry machines which is free of all belts, pulleys and external mechanical brakes and clutches.

Still another object of the invention is the provision of a new and improved hydraulic transmission comprised of an electric motor driven pump and motors to be energized by the pump wherein the electric motor always starts without any appreciable load on it and an inexpensive type motor may be employed.

Another object of the invention is the provision of a new and improved transmission particularly adapted for use with laundry machines which while permitting variable speeds of operation of the machine, employs a low cost single speed electric motor as a power source.

Still another object of the invention is the provision of a hydraulic transmission for laundry machines and the like wherein all operating parts may be completely sealed in a single housing.

Another object of the invention is the provision of a new and improved hydraulic transmission wherein either motor may be selectively energized by selecting the direction of rotation of the electric drive motor.

Another object of the invention is the provision of a new and improved hydraulic transmission for laundry machines which automatically locks the spin basket from rotation while the agitator is in operation.

Another object of the invention is the provision of a new and improved transmission for laundry machines of the type described which automatically brakes the spin basket to a stop whenever the electric drive motor is deenergized.

Another object of the invention is the provision of a new and improved hydraulic transmission particularly adapted for laundry machines of the type described wherein the agitator automatically is free to rotate with the spin basket.

Still another object of the invention is the provision of a new and improved hydraulic transmission of the general type described wherein the speed of rotation of the spin motor is automatically controlled by the level of water in the tub.

Another object of the invention is the provision of a new and improved hydraulic transmission for laundry machines of the type described wherein the static friction on the thrust bearing supporting the weight of the clothes in the machine is automatically reduced at the beginning of each spin cycle.

Another object of the invention is the provision of a new and improved hydraulic transmission particularly adapted for laundry machines of the type described having a variable volume hydraulic pump energizing either an agitator motor or a spin motor and wherein the same range of adjustment of the pump produces a greater speed variation of the agitator motor than it does of the spin motor.

Still a further object of the invention is the provision of a new and improved hydraulic transmission wherein its operation may be controlled without external means such as solenoids or other types of control.

Still another object of the invention is the provision of a new and improved hydraulic circuit between a hydraulic pump and a pair of hydraulic motors which enables one motor to be free to rotate while the other motor is energized and which locks the other motor against rotation when the first motor is energized.

PREFERRED EMBODIMENT OF INVENTION

The invention may take physical form in certain parts and arrangements of parts, a preferred embodiment of which will be hereinafter described in this specification in detail and illustrated in the accompanying drawings which form a part hereof and wherein:

FIGURE 11 is a cross-sectional view of FIGURE 1 taken approximately on the line 11—11 thereof and showing the valve of the agitator motor being in such a position that the motor is rotating in a clockwise direction;

FIGURE 12 is a view similar to FIGURE 11 but showing the agitator motor in the full counterclockwise position wherein the key has been withdrawn from the keyway so as to free the motor from its driven shaft;

FIGURE 13 is a cross-sectional view of FIGURE 1 taken approximately on the line 13—13 thereof with the position of the vane of the motor being that shown in FIGURE 12 and the key being shown in phantom lines;

FIGURE 14 is a fragmentary cross-sectional view similar to the right-hand side of FIGURE 1 but with the section line being taken on the lines 14—14 of FIGURE 11 and approximately on the line 14—14 of FIGURE 10;

FIGURE 15 is a cross-sectional view of FIGURE 1 taken approximately on the lines 15—15 thereof and showing the spin motor;

FIGURE 16 is a cross-sectional view of FIGURE 1 taken approximately on the lines 16—16 thereof and showing the manifold porting for the spin motor;

FIGURE 17 is a cross-sectional view of FIGURE 1 taken approximately on the line 17—17 thereof.

Figure 1:
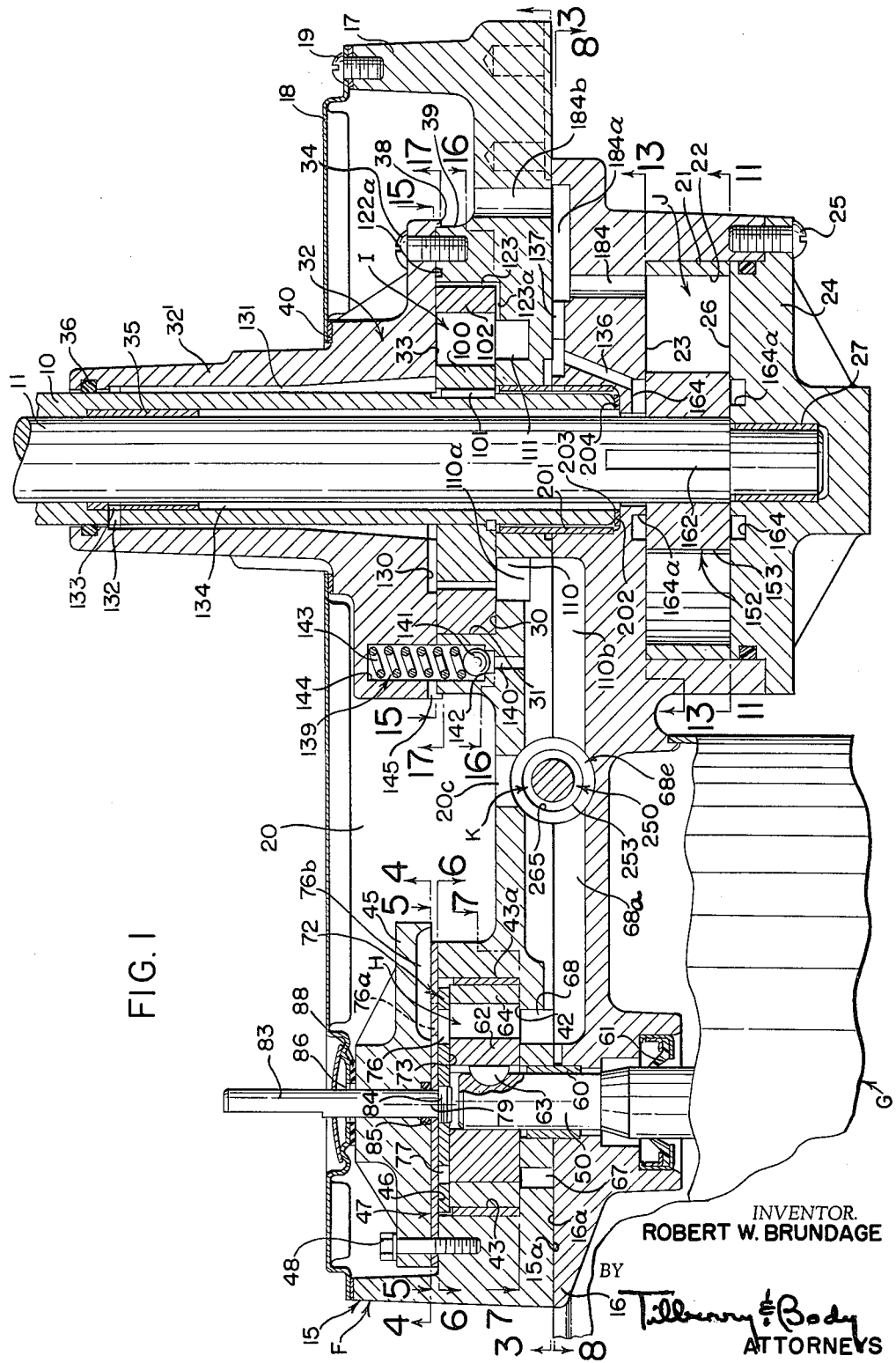
FIGURE 1 is a side cross-sectional view of a hydraulic transmission illustrating a preferred embodiment of the present invention taken approximately on line 1—1 of FIG. 8.
Figure 2:
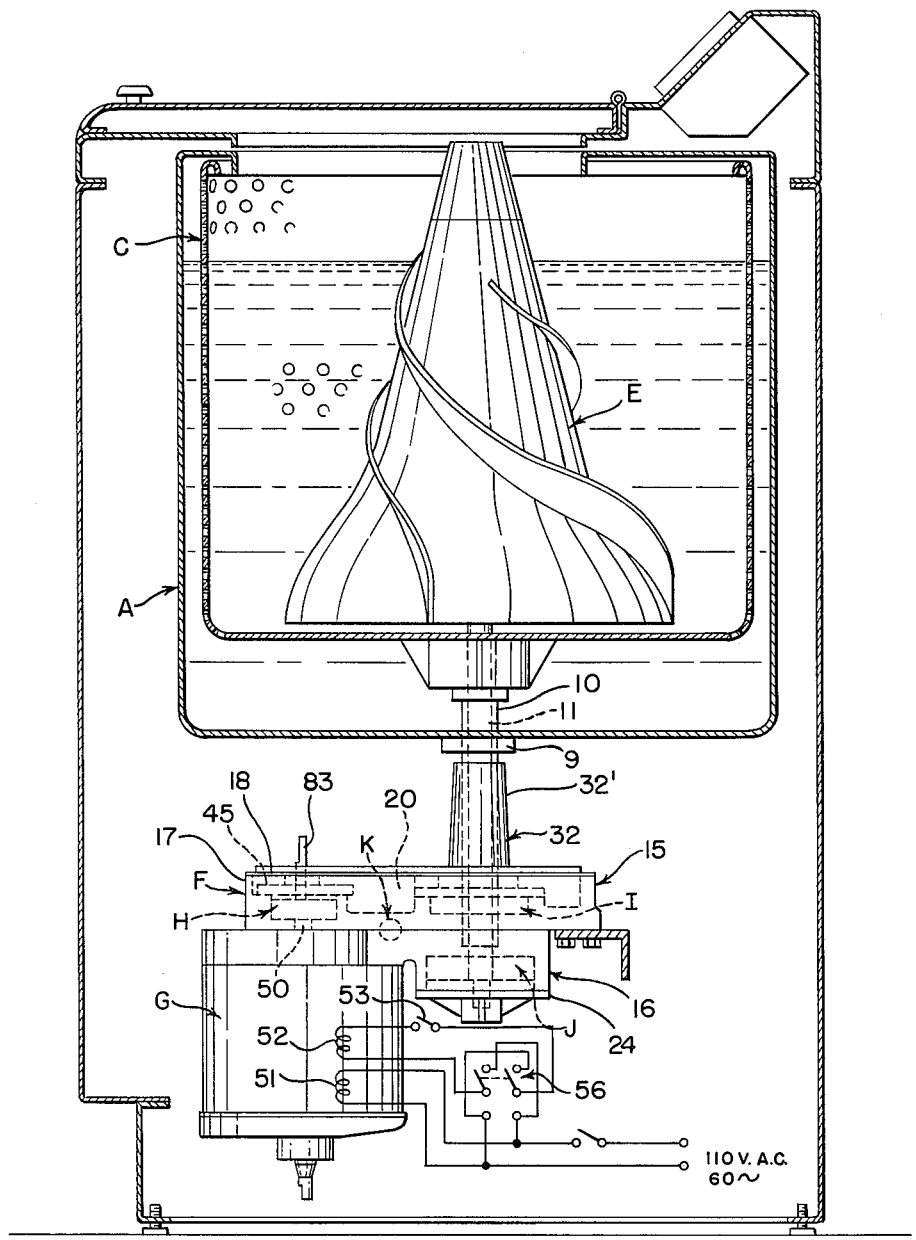
FIGURE 2 is a side cross-sectional view showing the transmission in operative relationship with the elements of a laundry machine.
Figure 3:
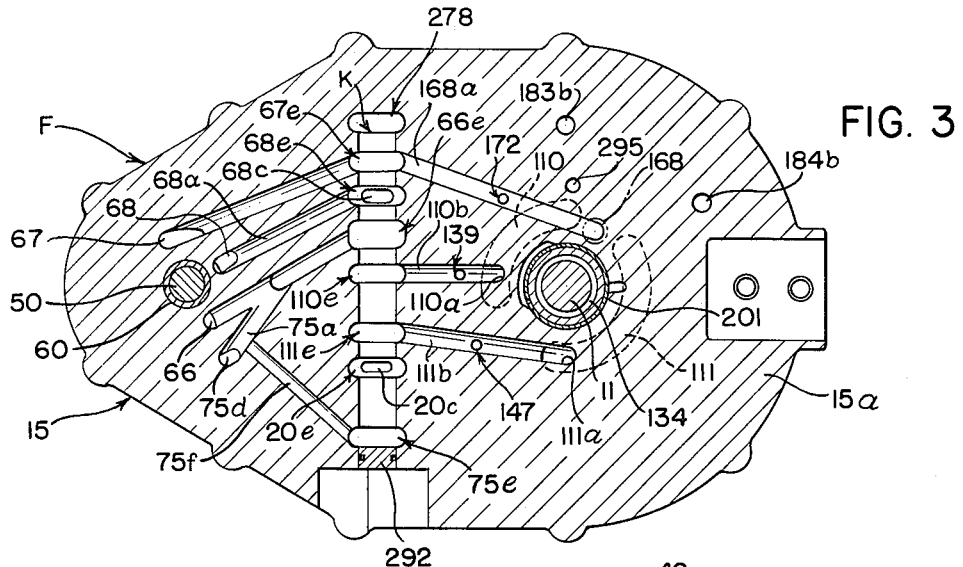
FIGURE 3 is a cross-sectional view of FIGURE 1 taken on the line 3—3 thereof and in effect is a view looking upwardly.
Figure 4:
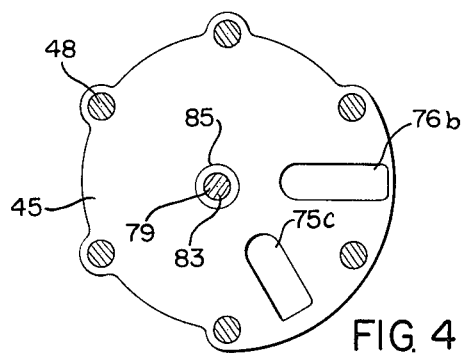
FIGURE 4 is a cross-sectional view of FIGURE 1 taken approximately on the lines 4—4 thereof and also looking upwardly.
Figure 5:
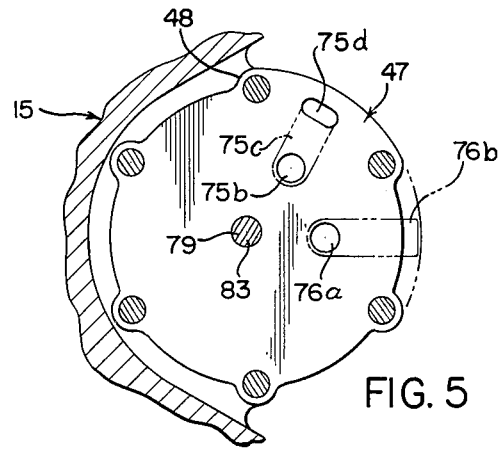
FIGURE 5 is a cross-sectional view of FIGURE 1 taken on the line 5—5 thereof which is the same line as 4—4 but looking downwardly.

Referring now to the drawings, wherein the showings are for the purposes of illustrating a preferred embodiment of the invention only, and not for the purposes of limiting same, FIGURES 1 and 2 show, somewhat schematically, a laundry machine comprised of a tub A, a perforated basket C concentrically arranged in the tub and an agitator member E concentrically arranged within the basket and arranged to be oscillated and agitate the clothes within the basket. Positioned immediately below the tub A and supported relative thereto is the hydraulic transmission of the present invention comprised generally of a housing F, an electric motor G driving a hydraulic pump H, a hydraulic spin motor I mechanically coupled to the basket and adapted to spin same when energized, a second hydraulic motor J mechanically coupled to the agitator E and adapted to oscillate same when energized. Valve means K within the housing selectively control the flow of fluid through suitable passages provided in the housing from the pump to either of the two motors, all as will be hereinafter described.

LAUNDRY MACHINE

The laundry machine per se forms no part of the present invention and is shown solely for the purpose of illustrating how the transmission of the present invention may be applied to such a machine. Thus, the tub A may take any known or desired shape as is required for the washing. Suitable means, not shown, may be provided for supplying water to, or removing such water therefrom. Normally, the tub A is supported on legs, not shown, which extend to the bottom of the machine, and are then pivotally mounted so that the tub and all the rest of the mechanism may move slightly from side to side to absorb unbalanced forces created by centrifugal force on unequal distribution of clothing within the basket C during the spin cycle.

The basket C may also take any desired form or shape, but is generally perforated so that the water may pass freely into and out of the basket, so that the water in the clothing may be centrifuged thereout during the spin cycle. In another type of machine the basket walls are solid and the water is spun over the top to separate it from the clothes. This basket is supported for rotation upon a hollow shaft 10, which passes downwardly through a water-seal bearing 9 in the lower part of the tub A into the housing F of the transmission as will be hereinafter described.

The agitator E also may be of any desired shape or construction and is supported for oscillation on a shaft 11 positioned within the shaft 10 and extending upwardly beyond the upper end of the shaft 10, where it is fastened to the agitator E in any desired manner. This shaft 11 is rotatably supported in the shaft 10 by means of a bearing sleeve 35 pressed into the inside of a counterbore on the inside of shaft 10 and extends downwardly through and beyond the lower end of the shaft 10 where it is releasably keyed to the agitator motor J as will be described.

HOUSING

The housing F is mounted relative to tub A either fixedly or preferably through resilient shock mounts not shown. In the embodiment shown the housing F is comprised of two main pieces, an upper housing 15 and a lower housing 16 having lower and upper surfaces 15a, 16a respectively, which surfaces as will appear, have the hydraulic circuit of the transmission as well as the valving surfaces for the valve K formed therein and which surfaces are in tightly sealed engagement. In the preferred embodiment these surfaces are cemented together although conventional bolts may be employed at an increase in size of the housing and increased cost.

A wall or flange 17 extends around the upper edge of the upper housing 15 and a cover plate 18 is held in sealing engagement with the upper edge of this flange by a plurality of fastening means, such as the screws 19, to form an oil reservoir 20 for the transmission.

The lower side of the lower housing 16 on the right hand side as viewed in FIGURE 1 has a cylindrical recess having a flat upper surface 23 and in which is positioned a steel sleeve 21 having an inner cylindrical surface 22 which surfaces define a cavity for the agitator motor J. The axis of the surface 22 is parallel to and coincident with the axis of the shafts 10, 11. The lower side of the recess is closed by a cap 24 fastened to the housing by suitable fastening means, such as the screws 25, and has an upper surface 26 with a recess therein, coaxial with and receiving a bearing sleeve 27, and the lower end of shaft 11.

In a similar manner, the upper surface of the upper housing member 15 has a recess defined by a flat surface 30 and a cylindrical surface 31 to define the housing for the basket spin motor I. The cylindrical surface 31 has an axis parallel to, but slightly offset from, the axis of shaft 11. A cover plate 32 having a lower surface 33 completes the motor housing and is fastened to the upper surface of the upper housing 15 by suitable fastening means, such as the screws 34. This cover plate has an upwardly extending cylindrical column 32′ having an inner cylindrical passage through which the shaft 10 extends. An O-ring seal 36 positioned in a groove in the upper end of the cylindrical passage of the column 32′ and bearing against the outer surface of the shaft 10 provides a seal at this point.

The plate 32 also has a small cylindrical flange 38 surrounding the surface 33 meeting with a cylindrical surface 39 on the upper surface of the upper housing 15 for accurately locating the plate 32 relative to the housing. It will also be noted that the cover plate 18 has an opening through which the column 32′ passes and the column 32′ has an upwardly facing shoulder 40 against which the cover plate 18 sealingly bears.

The upper surface of the upper housing 15 on the left hand side also is provided with a recess having a lower surface 42 and in which is positioned a steel sleeve 43a having an inner cylindrical surface 43 which recess provides a housing for the pump H. This recess is then closed by a cap 45 and ported plate 47 having a lower surface 46 in sealing engagement with the upper surface of the housing 15 which cap 45 and plate 47 are suitably fastened to the housing by any suitable means, such as screws 48.

The cylindrical surface 43 has an axis parallel to but slightly offset from the axis of a shaft 50 extending upwardly through the lower housing 16 from the motor G.

MOTOR

The motor G is the power source which powers the entire transmission unit. It may take any one of a number of known forms, but by virtue of the present invention, may be of a type having a low starting torque; for example, a single phase A.C. motor of the split phase type. Such a motor is much less expensive than a high starting torque motor conventionally used in laundry machines today. Furthermore, the motor may be the single speed type rather than the multiple speed type which is now employed when it is desired to obtain variable speed oscillations or spin.

Thus, in the preferred embodiment, the motor G has a running winding 51 and a starting winding 52 which is disconnected by a centrifugal switch 53 operatively associated with the motor shaft 50. One of these windings is connected to an alternating current power source through a polartiy reversing switch 56 so that depending upon the position of the switch 56 the motor may be made to start in either direction.

In the embodiment of the invention shown, the lower surface of the lower housing member 16 is so shaped as to form the upper end bell of the motor G and the shaft 50, where it passes through the housing 16, is rotatably supported in a suitable bearing sleeve 60. An oil seal 61 is also provided. Obviously the motor in some instances could be independent of the housing. The arrangement shown is preferred and the least expensive.

The actual construction of the motor G forms no part of the present invention, it only being necessary for the embodiment of the invention shown that the motor G be readily reversible.

PUMP

The pump H may take a number of different forms, e.g., a reciprocating piston type pump, a rotating vane type pump, or the like; but in the preferred embodiment, an internal gear type pump is employed comprised of an externally toothed gear 62 keyed to the shaft 50 by means of a key 63 and an internally toothed ring gear 64 rotatably supported by the cylindrical surface 43 on an axis slightly spaced from that of the gear 62. As is conventional, the ring gear 64 has one tooth more than the internal gear 62 and the teeth of these gears are in sliding sealing engagement to provide a plurality of pumping chambers which progressively increase in volume after they pass the minimum volume point 72a (FIGURES 7, 8) on a neutral axis 70 to a point 70b of maximum volume on the neutral axis 70, and then progressively decrease in volume until they reach the minimum volume point 72a. Hydraulic fluid is thus sucked into and forced out of these chambers, depending on whether the volume is increasing or decreasing.

The lower surface 42 of the pump cavity has three manifold ports 66, 67, 68 extending downwardly therefrom into communication with passages 66a, 67a, 68a respectively formed in the abutting surfaces of the housing members 15, 16. These manifold ports 66, 67, 68 are generally arcuate and are positioned a distance from the axis from the shaft 50 such as to communicate with the chambers of the gears 62, 64 as they rotate. The arcuate ends of the manifolds 66, 67, 68 are circumferentially spaced from each other so that the surface 42 betwen the ends of ports forms the pump lands, 42a, 42b, 42c, it being noted that the entire surface 42 (and these lands) are in sliding sealing engagement with the lower surfaces of the gears 62, 64 to thus seal the chambers, one from the other, except where by virtue of a manifold port overlapping one or more chambers, they are in communication.

Figure 7:
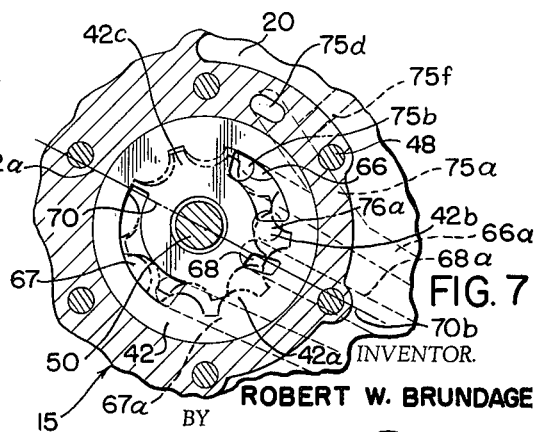
FIGURE 7 is a cross-sectional view of FIGURE 1 taken approximately on the line 7—7 thereof, it being noted that FIGURES 6 and 7 show the manifold port arrangement for the pump of the transmission.

The neutral axis 70 of the gears 62, 64 in relation to the arcuate ends of the manifold ports 66, 67, 68 and the corresponding lands 42a, 42b, 42c is as shown in FIGURE 7.

The pump H has a second set of manifold ports positioned in an adjustable manifold plate 72 located on top of the gears 62, 64. This plate 72 has a lower surface 73, in sealing engagement with the upper surface of the gears 62, 64 and an upper surface in sealing engagement with the lower surface of ported plate 47. This manifold plate 72 has (FIGURE 6) three arcuate manifold ports 75, 76, 77 extending therethrough; and the ends are respectively separated by portions of the surface 73, which may be called lands 73a, 73b, 73c; the ports being spaced from the axis of rotation of the shaft 50, such that they communicate with the chamber of the gears 62, 64 as they revolve. The manifold plate 72 is mounted for rotation through a limited arc about an axis 79 which is offset from both axes of rotation of the gears 62, 64 a short distance on the neutral axis towards the minimum volume point 72a, of the gears for reasons as are explained in my co-pending application, Serial No. 375,193, filed June 15, 1964.

The arc of movement of the manifold plate 72 is limited by a tab 80 on the plate 72 extending into an arcuate recess 81 in the housing and having circumferential ends which the tab 80 engages at either end of the arc of movement of the manifold plate 72. As will appear, rotation of this manifold plate 72 varies the output of pump H so that the speed of the basket and agitator motors I, J respectively, may be readily varied within limits.

A control shaft 83 rotatable in a vertical opening in the cap 45 and having a rectangular lower end 84 fits into a correspondingly shaped opening in the manifold plate 72 so that this plate may be readily rotated. An O-ring 85 seals this shaft where it passes through the cap 45. It is to be noted that the axis of rotation of the shaft 83 must be properly located relative to the axis of rotation of the shaft 50 which is the axis of rotation of the gear 62. The shaft 83 passes through an opening 86 in the cover plate 18. The cover plate 18 around this opening 86 is sealed to the upper surface of the cap 45 by a seal 88. Any suitable control means may be connected to the exposed end of the shaft 83.

Manifold port 75 at all positions of the manifold plate 72 is in communication with passage 75a in the abutting surfaces of the two housing members 15, 16 through a port 75b in the ported plate 47, groove 75c in the lower surface of cap 45 and a vertical passage 75d in the upper housing.

In the maximum volume counterclockwise position of plate 72, manifold port 76 is communicated with the pump or oil reservoir 20 through port 76a in plate 47, and a radial groove 76b in the lower surface of cap 45 which extends beyond the side of the housing 15 and is open to the sump 20.

It is to be noted that the manifold port 77 does not communicate with any passage in the housing. Its sole function is to communicate decreasing volume chambers with increasing volume chambers when the plate 72 is adjusted to positions for less than the maximum volume output of the pump.

BASKET MOTOR

Figure 10:
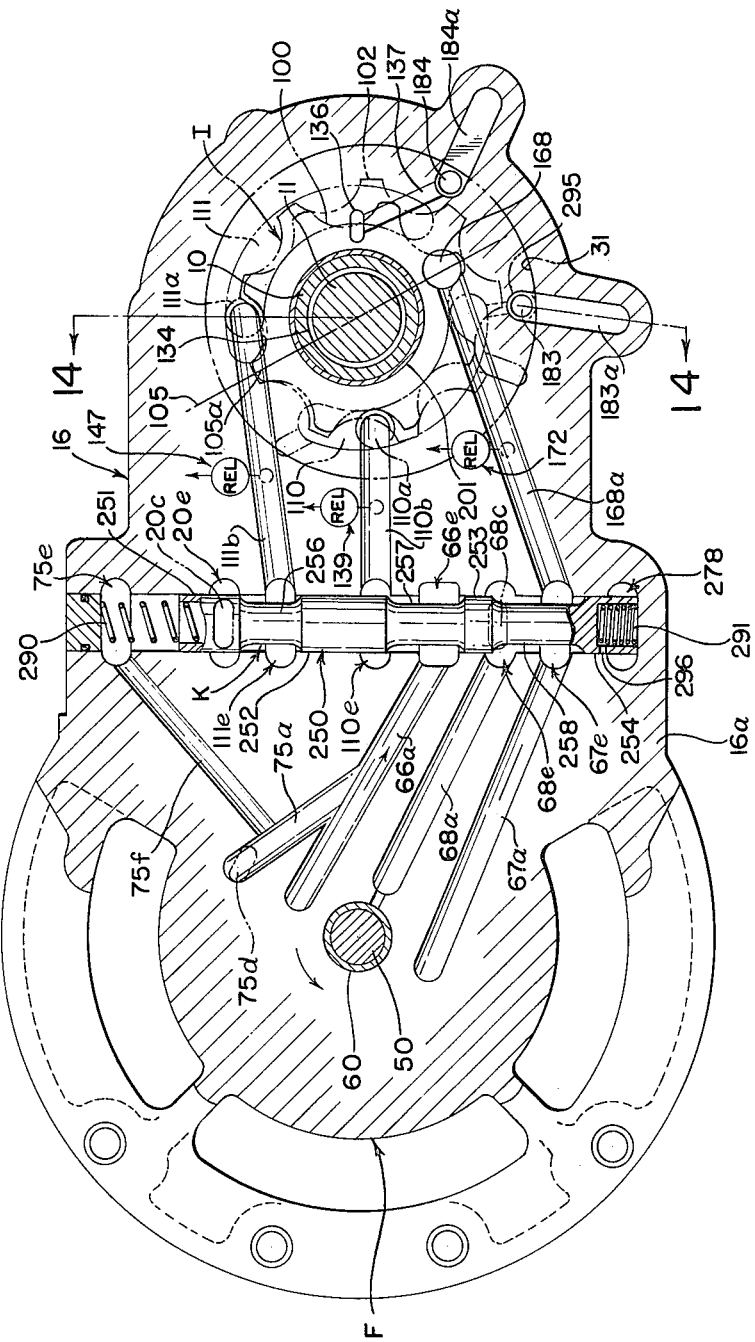
FIGURE 10 is a view similar to FIGURES 8 and 9 but showing in dotted lines the spin motor in relation to its conduits and showing the valve in the spin position.

The basket or spin motor I may take a number of different forms, e.g., a vane motor, but in the preferred embodiment is comprised generally of externally toothed gear 100 keyed for rotaion to the shaft 10 by means of a key 101, and an internally toothed ring gear 102 mounted for rotation in the cylindrical wall 31, on an axis spaced from the axis of rotation of the gear 100 and thus the shaft 10. The ring gear 102 has one tooth more than the gear 100, and the teeth are in sliding sealing engagement to form a plurality of chambers, which progressively increase and decrease in volume as the gears rotate. These gears have a neutral axis 105 as is shown in FIGURE 10.

The lower surface 30 of the recess is in sliding sealing engagement with the lower surface of the gears 100, 102, and has arcuate extending inlet and outlet manifold ports 110, and 111, respectively, formed therein spaced from the axis of rotation so as to communicate with the increasing and decreasing volume chambers of the gears. The inlet manifold port 110 has a passage 110a extending downwardly to communicate with a passage 110b formed in the abutting surfaces of the housing members 15, 16. Likewise the outlet manifold port 111 has a passage, 111a, extending downwardly to communicate with a passage 111b also formed in the abutting surface.

The surface 30 inbetween the arcuate ends of the manifold ports 110, 111 is in sliding sealing engagement with the lower surface of the gears 100, 102, and functions as the lands of the basket motor I. These lands have an arcuate width at least equal to the arcuate width of the gear chambers at their maximum arcuate width to thus prevent communication from one manifold port 110 to the other manifold port 111 through the chambers.

In the embodiment shown, the cylindrical surface 31 is provided with a plurality of elementally extending circumferentially spaced grooves, 120, 121, 122, 123, and 124. The grooves 120, 121 are symmetrically located on the high pressure chamber side of the neutral axis 105 and each communicates with the inlet port 110, which is at high pressure, through grooves 120a, 121a, respectively, in the surface 30 to supply hydraulic fluid at high pressure to the clearance (not shown) between the outer surface of the ring gear 102 and the surface 31.

In a like manner the groove 123 is located adjacent the mid-point of the low pressure chamber side of the neutral axis and communicates with the discharge port 111 of the motor I which is at suction pressure through groove 123a, in the surface 30. These three grooves provide a steep pressure gradient of hydraulic fluid in the clearance between the outer surface of the ring gear 102 and the surface 31 for reasons as are described in greater detail in my co-pending application, Serial No. 373,761, filed June 9, 1964.

Grooves 122, 124 are each located on the low pressure side of the neutral axis approximately midway between the neutral axis and the groove 123 and are intercommunicated by a groove 122a formed in the upper surface of the upper housing 15. These grooves have the function of equalizing the pressure gradient between grooves 120 and 123, and grooves 121 and 123, all as described in greater detail in my co-pending application.

A pressure relief valve indicated generally at 139 is associated with the pressure side of the spin motor I to prevent the build-up of excessive pressures at the time when the spin motor is initially energized to rotate or in the event that rotation of the motor or the basket is prevented for any reason. The pressure relief valve may take a number of different forms, but in the embodiment of the invention shown is comprised of a ball 141 held against a valve seat 142 by a helical coiled spring 143 bearing at one end against the ball 141 and at the other end against the base of a bore 144 formed in the plate 32. This bore 144 is communicated to the reservoir 20 through a groove 145 in the lower surface of the plate 32. The pressure slide of the ball 141 is communicated to the motor inlet passage 110 through a passage 140.

A further pressure relief valve 147 of exactly similar construction maintains a controlled back pressure on the discharge passage 111b when discharge of fluid is blocked by the valve K to brake the spin motor I and the basket C to a stop. Design or adjustment of this valve controls the rate of braking of the basket C.

AGITATOR MOTOR

The agitator motor J may take a number of different forms capable of producing the desired oscillating motion, e.g., a rotating motor or a reciprocating piston with a motion translating mechanism but in the preferred embodiment a vane type oscillating motor is employed. The motor as shown is comprised of a piston 152 made up generally of a central hub 153, and a vane 154. The vane 154 has a vertical groove in its outer radial end in which a steel roller 155 is loosely mounted. This roller slidingly and sealingly engages the surface 22 while the hub 153, vane 154 and the roller 155 each have an axial length such as to sealingly and slidingly engage the upper and lower surfaces 23, 26 of the agitator motor housing.

The hub 153 is releasably keyed to the shaft 11 by means of a key 158 radially slidable in a slot 159 in the hub 153 and biased towards the shaft 11 by means of a spring 160 to engage one of preferably three equiangularly spaced key-ways 162 in the shaft 11. More than three key-ways can be provided if desired. The key 158 has a pair of identical lugs 163 on its upper and lower surfaces which extend into identical arcuate grooves 164 formed in the surfaces 23, 26 respectively. The radially inner surfaces 164a, of these grooves are so shaped as to form a camming surface 164b, on the clockwise end, as viewed in FIGURE 13, so that when the shaft 11 is rotated through sufficient clockwise arc, the lugs 163 engage the respective camming surfaces 164b, and the key 158 is then retracted from the key-way 162. The shaft 11 is then free to rotate without the hindrance by the agitator motor piston 152.

Various types of valves may be provided for communicating the high pressure from the pump H to either side of the vane 154 and for alternating such shift at a predetermined time. In the preferred embodiment, a toggle action valve is provided positioned within the motor chamber and arranged so as to be directly actuated by the position of the vane, and so arranged that the pressure forces on it will always shift it to one position or the other and hold it in such position.

In the preferred embodiment, the valve comprises a member 165 of a thickness such that its upper and lower surfaces are in sliding, sealing engagement with the surfaces 23, 26; that is to say, its axial length is the same as that of the piston 152. This member 165 is pivoted about an elemental axis 166 substantially spaced from the axis of rotation of the shaft 11. On the line 166a between such axes, a port 168 in the upper surface 23 extends upwardly to communicate with a passage 168a in the abutting housing surfaces and provides the fluid inlet for the motor J.

A pressure relief valve 172 communicates the passage 168a to the sump.

The valve member 165 is symmetrical about this line 166a through the axes and has a pair of sealing surfaces 173, 174 one on either side of the line 166a, which are adapted to alternately sealingly engage the surface 22 as the valve member pivots from one position to the other. The valve member165 has a pair of sealing members in the form of steel rollers 176, 177, each mounted loosely in grooves 178, 179 formed in the surfaces of the member facing the hub 153 located one on either side of the line through the two axes. The walls of these grooves 178, 179 converge slightly to a spacing just less than the maximum diameter of the rollers so as to retain the rollers within the grooves while allowing them to protrude therefrom and alternately sealingly and slidingly engage the surface of the hub 153 as the valve member 165 pivots from one position to the other.

The member 165 has a surface 182 coaxial with axis 166 and in sliding sealing engagement with a mating recess formed in the surface of the ring 21. A pair of discharge ports 183, 184 are provided in the surface 23 which extend upwardly through the lower housing 16 to communicate with passages 183a, 184a in the abutting surfaces of the housing members 15, 16 and thence communicate with vertical passages 183b, 184b in the upper housing member to communicate with the oil reservoir 20. These ports 183, 184 are located one on either side of the line 166a and between the line 166a and the point of engagement of the surfaces 173, 174 with the surface 22.

It is to be noted that the return passage from the ports 183, 184 to the oil reservoir 20 must be sufficiently restricted either by the length and diameter of the passage to the reservoir 20 or by a restricting orifice or both, such that when fluid is being discharged through one of these ports there will be a substantial amount of back pressure, e.g., something around 20 pounds per square inch on the discharge side of the motor. This back pressure performs an important function and is more fully described in my co-pending patent application Serial No. 335,777, filed June 6, 1964.

In operation, hydraulic fluid is supplied through port 168 to either side of the agitator motor J depending upon the position of the valve member 165. When the valve member 165 is in the counter-clockwise position as is shown in full lines of FIGURE 11, the fluid flows to the right and biases the valve member 165 in a counter-clockwise direction to press the surface 173 into sealing engagement with the surface 22. Also the steel roller 177 is pressed into sealing engagement both with the surface of the hub 153 and against the counter-clockwise side of the groove 179. The fluid pressure then increases and forces the vane to rotate in a clockwise direction. Fluid is discharged from the left hand side of the agitator motor through port 183.

The outer surface of the hub 153 is generally cylindrical except just adjacent to both sides of the vane 154, at which points its diameter increases slightly to provide camming surfaces 180, 181. As the piston 152 rotates in a clockwise direction, the camming surface 180 engages the roller 177 forcing the valve member 165 to move in a clockwise direction, at which point the hight pressure fluid on the right hand side of the vane flows past surface 173 to the back side of the valve member 165 and builds up a pressure here due to the restriction in the discharge port 184. This pressure causes the valve member 165 to snap to its full clockwise direction, at which time the surface 174 comes into sealing engagement with the surface 22 and the roller 176 into sliding, sealing engagement with the outer surface of the hub 153. The high pressure fluid is then discharged to the left hand side of the vane 154 forcing it to rotate in the counterclockwise direction. When the piston has reached its full rotation in this direction, the camming surface 181 engages the roller 176 and the valve member 165 immediately shifts to its full counterclockwise position as is shown in solid lines in FIGURE 11.

A hydraulic motor having this type of snap action valve is particularly of value for the operation of an agitator of a washing machine for reasons as described in my co-pending application Serial No. 335,777, filed June 6, 1964 in that the speed of rotation reverses almost instantaneously to its maximum value giving what may be termed a square wave type of agitator action rather than the sinusoidal type of agitator action heretofore found in mechanically energized laundry machines wherein a crank type mechanism was employed to change the rotary motion to oscillating motion.

It is to be noted that the cam surface 180 is so located relative to cam surface 164b that cam surface 180 engages roller 177 to reverse the direction of rotation before lug 163 engages cam surface 164b to withdraw key 158 from its key-way 162. Lug 163 and cam surface 164b only work when the piston 152 is rotated by forces transmitted to it through the shaft 11 in a clockwise direction beyond the point where it would normally be reversed by the valve member 165 when the motor J is being supplied with fluid under pressure.

A pressure relief valve 172 similar in construction to valve 147 communicates passage 168a with reservoir 20.

SHAFT LUBRICATION

The shafts are lubricated by bleeding off a small amount of fluid from the high pressure chambers of the spin motor I through the following hydraulic circuit: radial groove 130 in the surface 33 of the plate 32; clearance 131 between the inner surface of the column 32' and the outer surface of shaft 10; radial passages 132, 133 located just below the O-ring seal 36; through the shaft 10 and the sleeve bearing 35; clearance 134 formed between the inner surface of the shaft 10 and the outer surface of the shaft 11; groove 164 formed in the surface 23 of the agitator motor housing; vertically extending passage 136 in the housing 16; passage 137 formed in the abutting surfaces of the housing; passage 184a and passage 184b which communicates with the oil reservoir.

SPEED CONTROL OF BASKET MOTOR

The basket shaft 10 as shown in FIGURE 1 passes downwardly through the upper and lower housing, and is journaled in a bearing sleeve 201. The shaft 10 has an end surface 202 which abuts against a thrust washer 203 which in turn abuts against a shoulder 204 formed by counterboring the shaft passage. This thrust washer 203 thus supports the weight of the clothes and basket when the shaft 10 is not rotataing. The shaft 10 and basket C are vertically movable upwardly, however, from this non-rotation position. The inlet pressure to the spin motor I is communicated downwardly through the clearance around the key 101; through the clearances between the outer surfaces of the shaft 10 and inner bearing surfaces of the bearing sleeve 201 where it exerts an upward axial force on the end surface 202. The shaft 10 thus acts like a piston under the influence of these hydraulic pressures and will raise upwardly when the upward force exceeds the downward weight of the clothes and basket. Some of the fluid being supplied to motor I then flows between the end surface 202 and the thrust washer 203 into the clearance 134, from whence it flows as previously described back to the reservoir. Any fluid which flows by this route is lost to the spin motor I and its speed is correspondingly reduced by the amount of fluid bled off. The area of the end surface 202 is proportioned so that, at the hydraulic fluid pressures which will be developed in the operation of the machine, the shaft 10, with the basket and its load of clothes, and considering the buoyant effect of the water on the tub A, will be raised at the time that the valve K is shifted as will appear hereinafter to direct hydraulic fluid under pressure to the spin motor I.

This action, plus the action of the pressure relief valve 139, limits the maximum pressure which can be developed on the spin motor I, and also controls its speed as will appear hereinafter.

VALVE

The valve K has three positions; namely, neutral, (FIG. 8), agitate (FIG. 9), and spin (FIG. 10) and performs in each position a number of different functions.

In the neutral position, the valve K communicates the discharge of pump H to its inlet and blocks the discharge of basket spin motor I.

In the agitate position, the valve K directs the discharge of pump H to the inlet of agitator motor J, and at the same time blocks the flow of fluid to and from the basket spin motor I.

In the spin position, the valve K communicates the discharge of pump H (which in the preferred embodiment is rotating in the opposite direction from the agitate position) with the inlet of the spin motor I and the discharge of spin motor I to the reservoir. The valve K in this position also communicates the inlet of the agitator motor J to the reservoir suction.

The valve K may take any one of a number of different forms, and may be made up of a plurality of independent valves operated by external power means, e.g., solenoids and the like, but in the preferred embodiment and in accordance with one aspect of the invention, the valve K is comprised of a single unitary valve piston 250, reciprocable in a valve cylinder on a line of movement generally midway between the axes of the pump H and the motors I, J, and on the parting line between the upper and lower housings 15, 16. One half of the cylinder for the piston is formed in the lower surface of the upper housing member, and the other half is formed in the upper surface of the housing member. These surfaces are also grooved to form the passages heretofore described to communicate the various manifold ports with the valve cylinder.

The piston 250 (reading from top to bottom) has spaced lands 251, 252, 253, 254 separated by portions of reduced diameter forming valve passages 256, 257, 258. The valve cylinder in a similar matter has spaced lands 261, 262, 263, 264, 265, 266 and 267 separated by portions of enlarged diameter forming valve chambers 75e, 20e, 111e, 110e, 66e, 68e, 67e, 278. Chamber 278 communicates in the neutral and agitate position of the piston 250 with chambers 67e through passage 296 formed in the land 254. Chambers 20e and 68e communicate with reservoir 20 through passages 20c and 68c formed in the upper housing 15. Chamber 75e communicates with passage 75d through a branch passage 75f.

The ends of the piston 250 are counterbored at each end and a pair of helical coil springs 290, 291 fit one into each of the counterbores. The spring 290 bears at its opposite end against a screw plug 292, which closes the valve cylinder at the upper end. The spring 291 bears at its opposite end against the base 293 of the chamber 278. These springs 290, 291 are identical and operate to return the valve piston 250 to the neutral position as shown in FIGURE 8.

OPERATION—START-UP

To describe the operation of the transmission, it will be assumed that: water is in the tub A to the desired level, clothes are in the basket C in an amount not exceeding the design load of the laundry machine, and the oil reservoir 20 and all chambers and passages in the housing are completely filled with hydraulic fluid.

Figure 8:
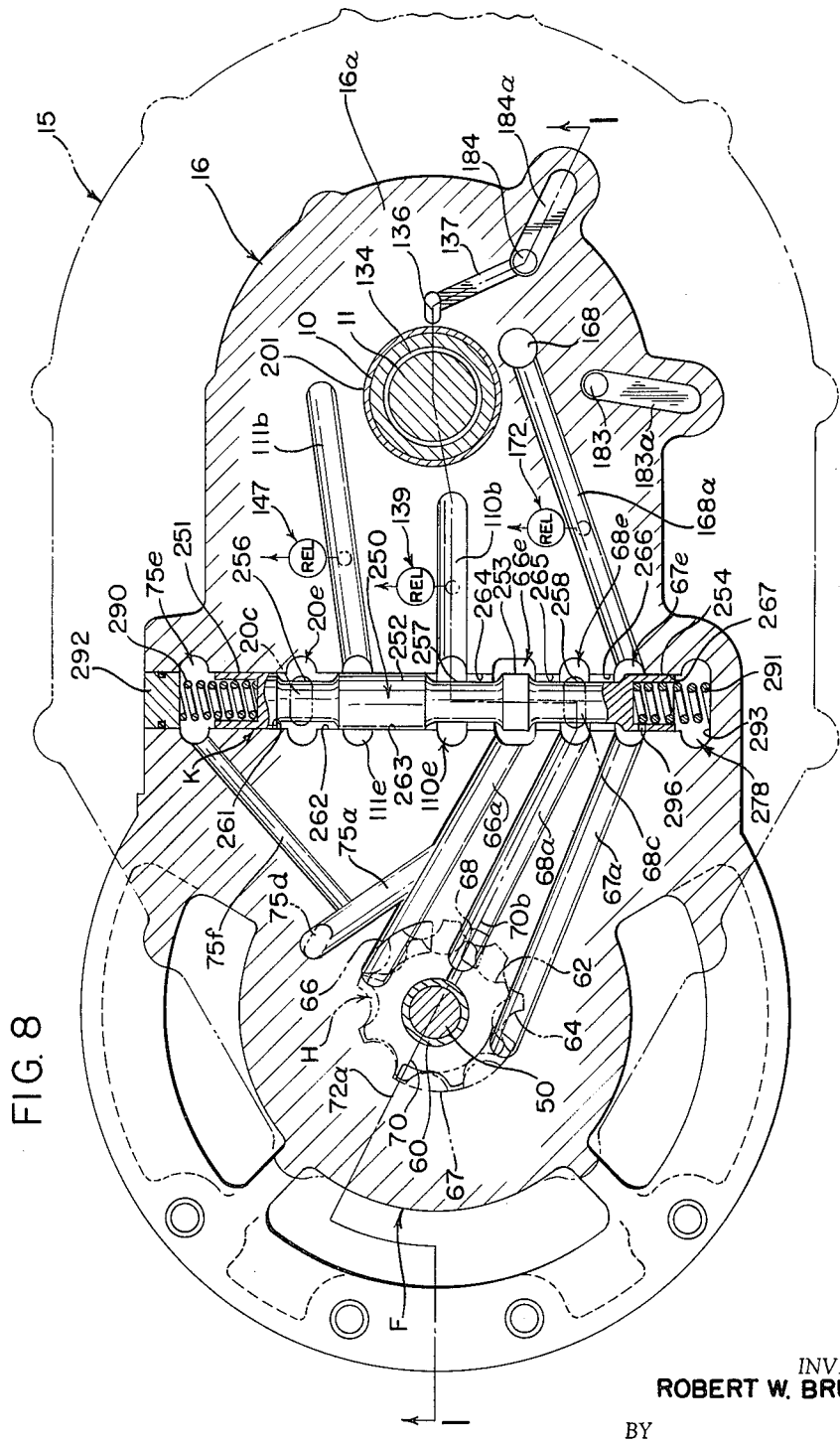
FIGURE 8 is a cross-sectional view of FIGURE 1 looking downwardly approximately on the line 8—8 thereof and showing in dotted lines the position of the lower manifold ports of the pump in relation to the hydraulic fluid conduits in the housing, the valve being shown in the neutral position.

The switch 56 is placed in the agitate position, and the motor G is energized and commences to rotate in a clockwise direction as viewed in FIGURE 8. Hydraulic fluid commences to flow from the pump through manifold port 67, passage 67a, chamber 67e, valve passage 258, valve chambers 68e, 66e and thence, through passages 68a, 66a to pump inlet ports 66, 68. As outlet is connected to inlet of the pump, the motor G starts without any appreciable load thereon.

The flow of fluid through the valve and back to the pump creates a slight velocity pressure in chamber 67e which is communicated to chamber 278 through passage 296. At the same time pump inlet port 75 is communicated to valve chamber 75e through passages 75b, 75c, 75d and 75f. The suction in chamber 75e and the pressure in chamber 278 cause the piston to move upwardly against the force of spring 290. As this occurs, piston land 254 engages cylinder land 266 and the flow of fluid from chamber 67e to chamber 68e, 66e is cut off. The output of the pump then flows from chamber 67e through passage 168a to the inlet port 168 of agitator motor J. Pressure in chamber 67e commences to build up which is communicated through passage 296 to the lower end of valve piston 250. This pressure locks piston 250 in the agitate position.

It will be appreciated that a definite time interval is required for the valve piston 250 to shift to this agitate position and during this time interval the motor G has had an opportunity to come up to at least a fraction of its full load speed without having any load thereon. The time interval may be adjusted by proper design of the size of passage 296 and is preferably such that the motor has reached at least 10% of its full load speed before the valve has shifted all the way to the agitate position and the load of the transmission is on the motor G.

OPERATION—AGITATE

Thereafter hydraulic fluid continues to flow through inlet port 168 of the agitator motor J. As viewed in FIGURE 11, the pressure goes into the right hand chamber of the pump, causing the vane to move in a clockwise direction. This movement continues until cam surface 180 engages the roller seal 177 which then cams the valve member 165 in a clockwise direction breaking the seal between the surface 173 and the inner surface 22 of sleeve 21. When this happens, the high pressure fluid flows into the space back of valve member 165 and through port 184 and passage 184a back to the sump. However, the restriction to flow of fluid in this passage causes a buildup in pressure and this pressure on the back side of the valve member 165 causes it to quickly and rapidly move further in a clockwise direction until the roller 176 engages the outer surface of the hub 153. At this time, the high pressure fluid coming in through passage 168 flows to the left and exerts a closing force on the valve member 165 to force surface 174 into sealing engagement with the surface 22 and then exerts a force on the vane 154 causing it to rotate in a counterclockwise direction. The vane 154 continues to rotate in the conuterclockwise direction until the cam surface 181 engages the roller 176, at which time the above action is repeated and the valve member 165 shifts to the opposite position, and the pressure is communicated to the opposite side of the vane 154 and it commences to rotate in a clockwise direction. During this time, fluid is discharged from the motor into the reservoir 20 and fluid flows to the pump H through passage 68c and passages 68e and 66a. The restriction to the flow of fluid through these passages creates a back pressure on the vane 154 and on the valve member 165 which holds the valve member in position in the event inertia and torsion forces cause movement of the vane at a speed faster than fluid is being supplied to the motor J. In this event, inlet pressure would drop to a vacuum and (in the absence of the back pressure) the valve member might open slightly and then be forced to its opposite position when the pressure was again raised. This action continues for as long as the pump motor continues to rotate in a clockwise direction.

When the valve piston 250 moves to the upward-agitate position, the outlet and inlet of the basket spin motor I are blocked so that the basket motor and basket are prevented from moving in either direction under the influence of the oscillations of the agitator. Make-up fluid for any fluid which leaks from this closed circuit is supplied through check valve 295 (FIGURE 14) communicating with port 183 and passage 183a.

When it is desired to stop the agitating, the electric motor G is de-energized. The pressures all drop to zero and the valve piston 250 returns to the neutral position under the force of spring 290.

OPERATION—SPIN

Figure 9:
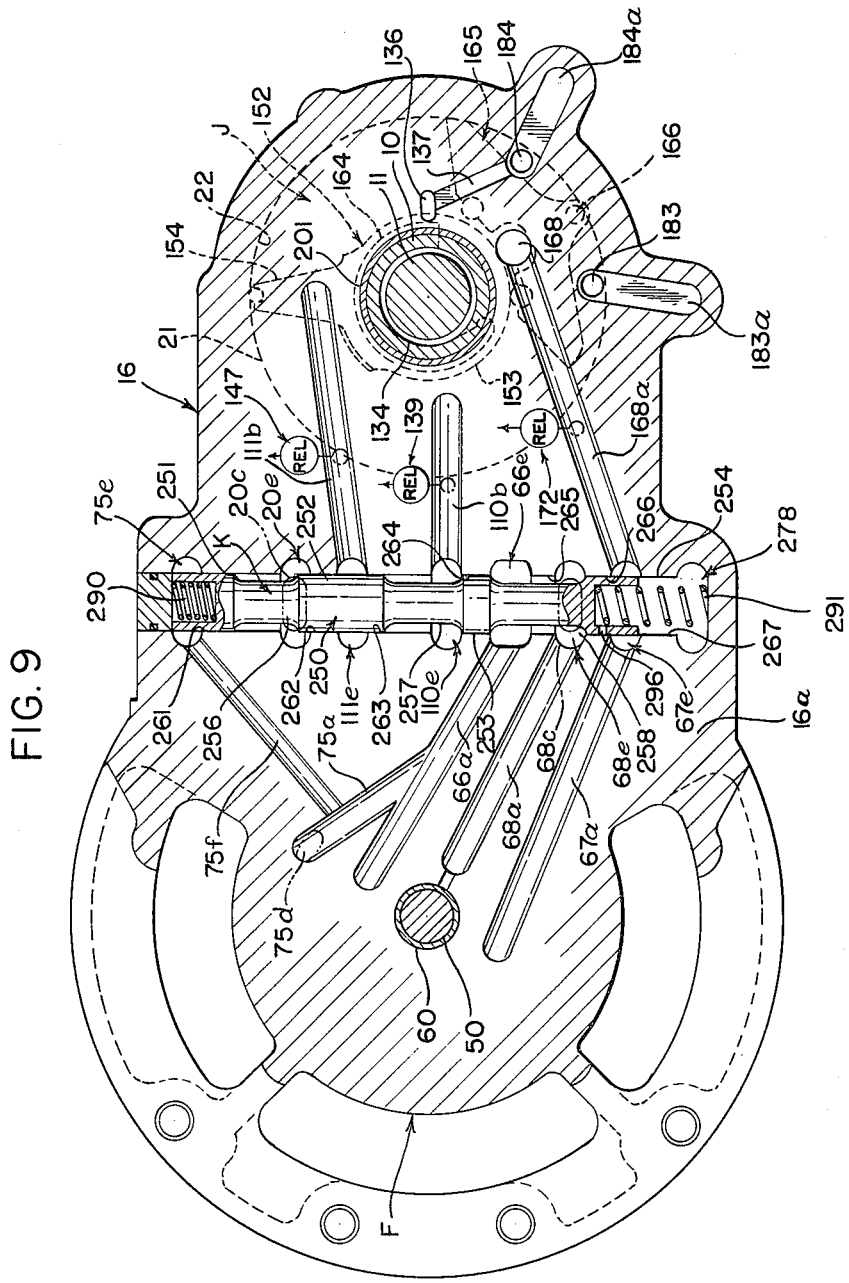
FIGURE 9 is a cross-sectional view of FIGURE 1 looking downwardly approximately on line 8—8 thereof and showing in dotted lines on the right hand side the agitator motor and the conduits leading thereto, the valve being shown in the agitate position.

When it is desired to cause the basket C to spin and centrifugally force the water out of the clothes, the switch 56 is placed in the spin position, and the motor G energized, which causes it to rotate in a counterclockwise direction as viewed in FIGURES 8–10. When this occurs, fluid is discharged from manifold port 66 through valve chamber 66e to valve chamber 68e which is communicated to the sump through passage 68c. The slight pressure created by the resistance to this flow is communicated to valve chamber 75e through passage 75f. At the same time, suction is created in manifold port 67 which is communicated to the valve chamber 67e, 278 through port 296; this slight pressure and suction causes the valve piston 250 to move downwardly until the land 253 sealingly engages the land 265. At this moment, the flow of fluid from manifold port 66 to the fluid sump is cut off. The pressure then increases which is communicated to chamber 75e causing the valve piston 250 to move the remainder of the way to the lower position.

During the brief period of time, however, for the valve piston 250 to move to this position, the electric motor has been able to commence its rotation without having any load imposed thereon and therefore, the motor starts readily.

The hydraulic fluid then flows from chamber 66e to chamber 110e and thence through passage 110b to the inlet port 110a of basket motor I to cause this motor to start to rotate.

Because of the inertia of the clothes in the basket, and of the water, there is a considerable resistance to the starting of this motor to rotate. To prevent excessive pressures from building up, pressure relief valve 139 (which is set to operate at around 600 pounds per square inch) opens to relieve this pressure.

At the same time, this pressure is communicated through groove 130 to the lower end 202 of the shaft 10 where it exerts an upward force, raising the shaft 10 a slight amount to break the friction at this point. This pressure continues to support the basket C during the entire spin cycle.

The motor I and the basket C then commence to rotate. This rotation is transmitted through the clothes to the agitator E, the shaft 11 and vane 153. These rotate clockwise as viewed in FIGURE 11 until lug 163 engages cam surface 164b which pulls key 158 from the keyway 162. Thereafter agitator E continues to rotate free of motor I.

The rotation of the basket C causes the water between the basket C and the tub A to rotate. Centrifugal action forces this water outwardly against the sides of the tub so that it forms what may be called a cup of water in which the basket rotates with the outer rotating surfaces of the basket at least partly in contact with the inner rotating surfaces of this cup. The centrifugal forces on the water are such that the basket rests on and is supported by the surface of the water. Thus, in laundry machines of conventional size it was found that when the basket C reached a speed of rotation of approximately 100 r.p.m., the basket and clothes in it were entirely supported on the centrifuged water and in effect were weightless, that is to say, they no longer exerted a downward force on the shaft 10. At higher speeds, the basket actually exerts a vertically upward force.

The basket and shaft thus move readily upwardly under the hydraulic forces on the surface 202, allowing fluid to flow past the surface 202 to the passage 136 and back to the oil sump. As the supply of fluid from the pump is at a constant volume, this results in an automatic limiting of the speed of rotation of the basket motor I. This speed of rotation continues at about 100 r.p.m. until such time as all of the water in the tub has been pumped, or drained out, which pumping action is normally caused by a centrifugal pump (not shown) mounted on the motor G and arranged to pump when it is rotated in a counterclockwise direction. When the water has all been pumped out, the clothes and the basket again have weight and force the shaft 11 downwardly to stop the flow of fluid past the surface 202. The speed of rotation of the basket motor then increases to the maximum which may be desired, but normally between 600–800 r.p.m. In effect, this construction forms a valve automatically sensitive to the water level and speed of rotation which limits the latter until the water level has dropped.

The basket continues to rotate until such time as the motor G is de-energized. This may occur at the end of a cycle and/or when the access door is opened. The valve piston 250 immediately returns to the neutral position and blocks the fluid being discharged from the basket motor I. Pressure relief valve 147 communicates passage 111b to the sump 20 and maintains a back pressure on the motor I to brake it to a stop. The rate of braking of the basket rotation is readily controlled by the characteristics of the valve 147.

It will be noted that all during this spinning operation, high pressure fluid has been circulating upwardly from the passage 130 through the passage 131 past the bearing 35 thence through the opening 133 and down past the bearing to the passage 136 where it is returned to the sump. Thus, the bearings are continuously flushed and lubricated during this spinning operation.

SPEED CONTROL—AGITATE AND SPIN

The speed of rotation of the spin motor I or the number of oscillations of the agitator motor J for a given unitary time period, such as a minute, is exactly proportional to the speed of rotation of the pump for the same time period multiplied by the ratio of the pump output volume per revolution to the volume of fluid required to make the spin motor I or agitator motor J go through one complete revolution or oscillation, as the case may be. The speed of the motors I, J may thus be varied by varying the speed of the pump or by varying the output of the pump per revolution.

To vary the speed of the pump requires either a variable speed transmission between the electric motor G and the pump H or a variable speed electric motor G, either of which is quite expensive and both of which give the same ratio of speed variations to the motors I, J, which is also undesirable. Thus, even if the agitate speed must be slowed down because the clothing is delicate or otherwise, it is still usually necessary to maintain the spin speed at a high value in order to obtain adequate centrifuging action.

To vary the output volume of the pump per revolution, it is possible to either bleed off some of the output volume through a valve or to rotate the manifold ports and sealing lands of the pump relative to its neutral axis. However, if this is done with constructions of pumps heretofore available, the same undesirable identical ratio of speed variations of the motors results.

In the embodiment of the invention shown, the output volume of the pump H per revolution is varied by rotating the manifold plate 72 with its manifold ports and lands relative to the neutral axis and the porting and lands of the pump are so arranged that for the same arc of rotation of the manifold plate 72, the changes in the output volume of the pump per revolution are different depending upon the direction of rotation of the pump.

Thus, as is seen in FIGURE 7, the pump has fixed manifold ports and lands in the surface 42 and rotatable ports and lands in the surface 73 of the manifold plate 72.

Thus, the manifold port 66 is located in one quadrant of one semicircle on one side of the neutral axis 70. The manifold port 67 is located in the diametrically opposite quadrant in the other semicircle on the other side of the neutral axis 70. Further, it will be noted that the lands 42a, 42b are in effect a fixed land located on the neutral axis at the open mesh point of the gears. The land 42c is located close to the closed mesh point of the gears.

The manifold plate 72, when in the maximum counterclockwise maximum volume position (not shown) has the manifold port 75 in the second quadrant of the same semicircle as the port 66 and it is to be noted that the ports 66 and 75 communicate with separate passages 66a, 75d respectively, which then interconnect.

The port 77 has an arcuate length so as to substantially span the semicircle on the opposite side of the neutral axis from the port 75. In this maximum counterclockwise position, the land 73c is on the neutral axis at the closed mesh point of the gears while the land 73a is on the neutral axis at the open mesh point of the gears. The land 73b separates and prevents intercommunication between the ports 66 and 75 axially through the gear chambers.

In this counterclockwise full volume position of the manifold plate 72, the pump H will deliver the same output volume per revolution regardless of the direction of rotation.

When the gears are rotating in the counterclockwise spin direction, fluid is discharged outwardly through both the ports 66 and 75. When the gears are rotating in the clockwise agitate direction, fluid is discharged both into the manifold port 67 and the manifold port 77. Manifold port 77, however, does not have a passage in the housing leading therefrom and fluid which is discharged into the counterclockwise end of the port 77, flows circumferentially therethrough and thence axially through the gear chambers to the manifold port 67. The full discharge volume of the pump thus flows into the manifold port 67.

The ratio of fluid pumped for either agitate or spin direction of rotation is thus one.

Figure 6:
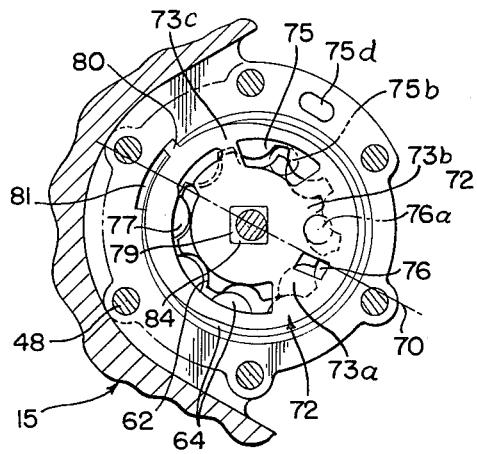
FIGURE 6 is a cross-sectional view of FIGURE 1 taken approximately on the line 6—6 thereof and in effect looking downwardly.

When the manifold plate 72 is rotated to the reduced volume position shown in FIGURE 6, a different situation prevails. In the clockwise agitate direction of rotation, the land 73a has closed off a segment of the decreasing volume chambers from communication with the port 77 and thus the port 67. This, in part, cuts down the output. Port 77 communicates the decreasing volume chambers which would normally be closed in this position of plate 72 by lands 73a, 73b and 42a with port 68 and prevents trapping of fluid therein.

At the same time, land 73c has moved so that port 77 communicates some of the increasing volume chambers with some of the decreasing volume chambers. Fluid from these decreasing volume chambers flows into these increasing volume chambers and because it is under high pressure, exerts a motor action and its energy is recovered. This fluid does not appear in the output.

When the pump is rotating in the counterclockwise spin direction, rotation of the land 73c over the decreasing volume chambers reduces the output volume of the pump because the fluid being discharged from those decreasing volume chambers now in communication with the clockwise end of the manifold port 77 flows through the port into the increasing volume chambers. This fluid is lost to the output. The movement of land 73b has no effect on the output volume. It simply allows ports 75 and 76 to overlap in an axial direction.

It is to be noted that when the pump is rotating in the counterclockwise spin direction, there are in actuality two discharge ports (which are intercommunicated remote from the ports) and one inlet port at all times. However, when the pump is rotating in the clockwise agitate direction, there is one discharge port and two inlet ports. In effect, the pump is "triple ported."

With such triple porting, when the pump is rotating in the clockwise agitate direction, and the manifold member 72 is adjusted to decrease the output volume of the pump, two lands affecting the output volume are moved. However, when the pump is rotating in the counterclockwise spin direction, only one land affecting the output volume is moved. As the volume change is proportional to the arc of movement of the lands and the number of lands, the change in volume for the same angular adjustment of the plate 72 is greater for agitate than for spin.

This same result could be obtained by triple porting the pump and directing the flow of one of the smaller ports to the sump by means of the valve when in the agitate position.

Likewise, this same differential adjustment of the output volume depending upon the direction of rotation of the pump may be obtained by utilizing the non-linear rate of discharge from each chamber as it moves from the point of maximum volume to the point of minimum volume. Thus, in an internal gear type pump of the type described, the output of the pump varies along the cosine curve as one of the seal lands of the manifold is rotated from the maximum position on the neutral axis. This results in relatively little change in volume for each degree of movement of a land as the land is started to be moved from the neutral axis which change in volume per degree of movement progressively increases as the angle of the land from the neutral axis approaches 90°. Thus, the adjustable manifold member may have three unequally spaced lands dividing the adjustable manifold into three distinct ports (at the maximum volume position), the first an outlet port on spin and inlet on agitate; the second an inlet port on spin and an outlet port to the sump on agitate; and the third an inlet port on spin and an outlet port on agitate. With this arrangement the lands affecting the volume output on spin are different than those affecting the output on agitate and at least one of the latter moves over the arc of movement of the chambers more remote from the neutral axes than the former.

In the arrangement of manifold ports and lands shown, the effect is to rotate two lands on agitate and one land on spin.

It is to be noted that the same result can be accomplished with the triple porting of the pump as shown by connecting one of the ports to either the oscillator motor J or the spin motor I by means of the valve K or some other valve.

Further in accordance with the invention, the axis of rotation of the manifold plate 72 is offset from the axis of rotation of the externally toothed gear 62 in a direction toward the minimum volume point 72a, the result being to increase the underlap of the sealing land when it goes from the low fluid discharge rate of the pumping elements to the high discharge rate of the pumping elements. This maintains approximately the same pressure drop into and out of the pumping cavities regardless of the position of the manifold member 72.

With the arrangement shown, the same adjustment of the manifold plate 72 produces for the same arc of adjustment a greater ratio of volume change of the pump when the pump is rotating in one direction than it does when it is rotating in the opposite direction. In the embodiment of the invention shown, it has been possible to obtain speed variations on the agitate of approximately two to one and on the spin of two to one and one-half.

This is desirable because in washing clothes it is sometimes desirable with delicate clothing to reduce the speed of agitation to prevent damage to the clothes. However, for the same fragile clothes, it is not as necessary to reduce the spin speed.

SQUARE WAVE AGITATION

The arrangement of a pump having a constant output volume for any given setting of the manifold plate 72 and pumping what may be termed a substantially non-compressible, hydraulic fluid is of particular value in a laundry machine when combined with a hydraulic motor which has a constant velocity when a constant volume of fluid is supplied thereto. Thus, such a pump delivers a constant output volume at a variable pressure, which pressure is proportional to the load imposed on the motor to which the fluid is being supplied. This means that in overcoming the inertia forces of the load at the beginning of each oscillation of the agitator motor J or the beginning of rotation of the spin motor I, the pressure can and does rise to relatively high peak values, e.g., 600 p.s.i., limited only by the pressure relief valves associated with the inlet of each motor. As the acceleration of a hydraulic motor is directly proportional to the instantaneous inlet pressure, it will be seen that the agitator J is accelerated very rapidly to its ultimate rotational speed or angular velocity. This rotational speed thereafter remains constant throughout the remainder of the oscillation and the inlet pressure drops to a value dependent upon the load on the motor. When the valve member 165 snaps to the opposite position, the motor with its load which has a high inertia force, must be reversed in its direction of movement and the pressure again momentarily rises to a high peak value to almost instantaneously reverse the direction of rotation and then returns to the lower value.

The shape of the curve of angular velocity of the agitator motor J plotted against time is substantially a square wave. Such a wave shape gives an improved washing action because of the high acceleration at the beginning and end of each oscillation with a low maximum velocity. High velocities tend to knot the clothes.

This type of operation may be distinguished from where an oscillating vane type motor is energized from a constant pressure (e.g., 60 p.s.i.) fluid source, such as a water main or the like. Here the acceleration which is proportional to the pressure is much less. Also, the maximum rotational speed or angular velocity is proportional to the load on the agitator motor and will vary dependent upon the weight of clothes in the laundry machine.

The operation may also be distinguished from a drive where the oscillating motion is obtained through a crank and connecting rod linkage which gives a speed of oscillation that varies sinusoidally with respect to time.

Thus, with the constant volume, variable pressure fluid source of the present invention, the time required for reversal of the agitator motor J to go from full speed in one direction to full speed in the opposite direction is much shorter and this full speed is substantially independent of the load on the agitator motor. A piston supplied from such a fluid source and acting through a rack and pinion has the same operating characteristics although it is bulkier and more expensive.

By a constant volume variable pressure source is meant a pump which, neglecting internal leakage but at constant speed, delivers the same volume of fluid regardless of the output pressure or conversely a pump where the output pressure varies to maintain the output volume constant.

With the arrangement shown, the agitator motor has a maximum rotational speed and a minimum rotational speed depending upon the setting of the manifold plate 72. If the manifold plate 72 is adjusted from maximum to minimum output volume during one oscillation of the agitator motor, the speed of the agitator motor during this one oscillation will change from maximum to minimum. Alternatively, the manifold plate 72 may be adjusted from maximum to minimum several times during one oscillation of the agitator motor J resulting in the agitator motor J increasing and decreasing its speed between the maximum and minimum values several times during each oscillation. Oscillation as used herein is intended to mean one half of a complete cycle.

Movement of the manifold plate 72 may be done manually, by a separate power source or by mechanically connecting it through a suitable linkage to the agitator motor's output shaft as is described in my copending application Serial No. 308,760, filed September 13, 1963. Such mechanism may move the manifold plate 72 in any desired frequency relationship either more or less, than the oscillations of the agitator motor.

This constant volume variable pressure fluid source is also of value with the spin motor I. Here, when the fluid is first communicated to the spin motor I, the pressure rises to relatively high peak values which pressure is employed to break the friction between the end surface 202 and the thrust washer 203. Thereafter, as the basket begins to rotate and becomes weightless, the fluid can flow past the end surface 204 and limit the speed of the spin motor I until the water has been drained out of the tub A.

The invention has been described in great detail sufficient to enable one skilled in the art of hydraulics and mechanics to duplicate the invention. Obviously, modifications and alterations of the preferred embodiment described will occur to others upon a reading and understanding of this specification and it is my intention to include all such modifications and alterations as part of my invention insofar as they come within the scope of the appended claims.

Having thus described my invention, I claim:

1. A hydraulic transmission comprised of a housing defined a plurality of cavities, hydraulic pump members in one of said cavities, first hydraulic motor members in a second one of said cavities, second hydraulic motor members in a third of said cavities, a valve member in a fourth of said cavities, said housing defining a plurality of passages, some of said passages communicating said pump member cavity with said valve member cavity, other of said passages communicating said valve member cavity with said first motor member cavity and still other of said passages in said housing communicating said valve member cavity with said second motor member cavity, said valve member being movable in said valve member cavity from a first position communicating said pump passages with said first motor passages to a second position communicating said pump passages with said first motor passages to a second position communicating said pump passages with said second motor passages.

2. The combination of claim 1 wherein said first motor oscillates and said second motor rotates.

3. The combination of claim 2 wherein said motors have coaxial output shafts.

4. The combination of claim 3 wherein said first motor connects to a shaft adapted to drive an agitator of a laundry machine and said second motor connects to a shaft adapted to spin the basket of a laundry machine.

5. A hydraulic transmission comprised of a hydraulic pump rotatable in either of two directions and having first and second ports, said first port being a discharging port when said pump is rotating in a first direction, said second port being a discharging port when said pump is rotating in the opposite direction, a first hydraulic motor and a second hydraulic motor and valve means having: a neutral position; a first position communicating said first port when it is a discharging port to said first motor; and, a second position communicating said second port when it is a discharging port to said second motor.

6. The transmission of claim 5 wherein said valve means in said neutral position intercommunicates said pump ports.

7. The transmission of claim 5 wherein said second motor has an outlet port and said valve means in said neutral position blocks flow of hydraulic fluid from said outlet port.

8. The transmission of claim 7 wherein means including a pressure relief valve communicates said second motor outlet port to low hydraulic pressure fluid whereby when the second motor is rotating and the valve means shifts to a neutral position, the second motor will be braked to a stop at a rate determined by said relief valve.

9. The transmission of claim 7 including means for shifting said valve means from its neutral position to either said first position or said second position a predetermined time period after the pump has started to rotate.

10. The transmission of claim 7 wherein said valve means includes a member having a line of movement and a surface transverse to said line of movement, one of said pump ports is communicated to said surface whereby when said port is a discharge port, said valve member is moved from one position to another on said line of movement.

11. The transmission of claim 5 wherein said second motor has inlet and outlet ports and said valve means in said first position blocks both said inlet and outlet ports.

12. The transmission of claim 11 wherein means including a check valve communicates low pressure hydraulic fluid to one of said second motor ports.

13. The transmission of claim 5 wherein said first motor includes an inlet port and said valve means in said second position also communicates low pressure hydraulic fluid to said first motor inlet port.

14. The transmission of claim 5 wherein said first and second motors each have inlet and outlet ports and said valve means in said neutral position blocks said outlet port of said second motor and in said first position blocks both said inlet and outlet ports of said second motor and in said second position communicates low pressure hydraulic fluid to said inlet port of said first motor.

15. The transmission of claim 5 wherein said valve means is an axially movable cylindrical member having a pair of axially facing surfaces, and means communicating one pump port to one of said surfaces and the other port to the other of said surfaces.

16. The transmission of claim 5 including means for shifting said valve means responsive to the direction of rotation of said pump.

17. The improvement of claim 16 wheerin said hydraulic pump is driven by a reversible electric motor.

18. A hydraulic transmission comprising in combination a hydraulic pump, a hydraulic rotating motor, a hydraulic oscillating motor, and valve means and passages for selectively shifting communication of an outlet of said pump from said first to said second motor, the improvement which comprises: said valve means having a first position communicating the pump outlet to said oscillating motor and simultaneously blocking the flow of fluid to and from said rotating motor.

19. The improvement of claim 18 wherein at least one of the passages communicating with said rotating motor has a one-way check valve permitting one-way fluid flow from an oil sump to the passage.

20. The improvement of claim 18 wherein said valve means has a second position wherein the pump outlet is communicated with said rotating motor and the inlet port to said oscillating motor is communicated with a sump whereby when the first motor rotates, the oscillating motor is free to move.

21. The improvement of claim 20 wherein means are provided for disconnecting said oscillating motor from its output shaft.

22. In a hydraulic transmission particularly adapted for laundry equipment comprised of a spin basket and an agitator in the spin basket comprising in combination a first oscillating type hydraulic motor, a shaft for connecting said motor to said agitator, a second rotating hydraulic motor, a shaft coaxial with said first shaft for connecting said second motor to said spin basket, means engaging said second-mentioned shaft to said second rotating hydraulic motor and other means releasably engaging said oscillating motor to its shaft.

23. The combination of claim 22 wherein said other means are responsive to rotation of said oscillating motor through a predetermined arc under the influence of external forces for disengaging the shaft from said motor.

24. A hydraulic transmission comprised of a hydraulic pump, means for driving such pump in either of two directions, a pair of hydraulic motors and valve means for selectively communicating said motors with said pump depending upon the direction of rotation of said pump, the improvement which comprises: adjustable means for varying the output volume of such pump, said adjustable means being so arranged that for the same amount of adjustment the volume output change of the pump is greater for one direction of rotation of the pump than for the opposite direction of rotation.

25. In a hydraulic laundry machine transmission wherein the laundry machine includes a basket adapted to be rapidly rotated with clothes on the inside thereof, a positive displacement type hydraulic motor for rotating said basket and having an outlet passage through which hydraulic fluid is discharged when said motor is rotating, the improvement which comprises means for blocking the discharge of fluid through said passage with a predetermined back pressure when said motor is rotating and is to be brought to a stop.

26. In a hydraulic laundry machine transmission wherein the laundry machine includes an agitator and a basket adapted to be rapidly rotated with clothes on the inside thereof, a positive displacement type hydraulic motor for rotating said basket and having an inlet and an outlet passage, the improvement which comprises: means for blocking the inlet and the outlet of said motor when it is not rotating and check valve means communicating a a sump to one of the passages of the motor to supply fluid to said passage.

27. In a hydraulic laundry machine transmission wherein the laundry machine includes a basket adapted to be rapidly rotated with clothes on the inside thereof, a housing, a hydraulic motor for rotating said basket and having an inlet and a discharge passage, a shaft interconnecting said motor and said basket, a thrust bearing on said housing engaging a downwardly facing surface on said shaft for supporting the weight thereof, the improvement which comprises: said shaft and basket being movable vertically upwardly away from said thrust bearing, means communicating the inlet pressure of said motor to said surface on said shaft whereby inlet pressure to said motor will exert an upward force on said shaft.

28. The improvement of claim 27 wherein valve means actuated by vertically upward movement of said shaft bleed fluid from said inlet whereby to limit the speed of said motor.

29. The improvement of claim 27 wherein the inlet pressure is communicated to one radial edge of the surface and the other radial edge is at low hydraulic pressure whereby when said pressure raises said shaft fluid can flow past said surface.

30. In a hydraulic laundry machine transmission for a laundry machine having a basket adapted to receive clothes and to be rotated to have water in the clothes centrifuged therefrom and rotation of the basket causes an apparent weight reduction thereof, a hydraulic motor for rotating said basket, means biasing said basket upwardly and valve means actuated by upward movement of said basket for limiting the supply of hydraulic fluid to said motor.

31. In a hydraulic laundry machine transmission for laundry machines comprised of a tub and a basket inside said tub for supporting clothes to be laundered, the basket being adapted to be rotated for the purpose of centrifuging water from the clothes and wherein said basket has an apparent weight reduction while rotating, a hydraulic motor for rotating said basket, the improvement which comprises: means biasing said basket upwardly whereby said basket will move upwardly as its rotational speed increases and it has an apparent weight reduction and means actuated by upward movement of said basket for reducing the amount of fluid supplied to said motor.

32. A hydraulic transmission comprised of an electric motor, a hydraulic pump driven by said motor, a hydraulic motor and valve means communicating an outlet of said pump to an inlet of the pump until said electric motor has reached at least 10% of its full speed and then to said hydraulic motor.

33. The combination of claim 32 wherein said valve means are interposed between said pump and said hydraulic motor and when the pump is not rotating communicate the outlet of the pump to low pressure and when the pump is rotating communicate the outlet of the pump to the hydraulic motor and means communicating the outlet of the pump to one end of the valve means whereby when said pump is started, the valve moves to communicate the outlet of the pump to the hydraulic motor.

34. The transmission of claim 32 wherein said transmission includes a hydraulic fluid sump and the communication between the outlet to the inlet of the pump is through the sump.

35. A hydraulic washing machine transmission comprised of a housing; a rotatable hydraulic pump in said housing and including pumping members mounted for rotation; a hydraulic rotary motor in said housing; a hydraulic oscillating motor in said housing; a tubular output shaft from said rotary motor and adapted to support a basket; an output shaft from said oscillator motor inside of said tubular shaft and adapted to support an agitator; valve means in said housing; passage means in said housing communicating said pump with said valve means and said motors with said valve means; an electric motor positioned externally of said housing including a rotor having an output shaft extending integrally into said housing and driving said pumping members, said motor including a stator surrounding said rotor and fixed to said housing, an end bell fixed to said stator and rotatably supporting the end of the rotor remote from the pumping members relative to said stator and bearing means in said housing rotatably supporting the end of said rotor shaft adjacent said pumping members.

36. A hydraulic washing machine comprised of an agitator member, a vane type hydraulic motor mechanically connected to said agitator, a constant volume variable pressure hydraulic pump energizing said motor and a hydraulically actuated toggle action valve member controlling the flow of hydraulic fluid to alternate sides of the vane of said motor and means alternating communicating the output pressure of said hydraulic pump to opposite sides of said valve member.

37. A hydraulic laundry transmission comprised of a first hydraulic motor adapted to rotate, a second hydraulic motor adapted to oscillate, a pump for supplying fluid to either of said motors, said pump having a neutral axis and on one side of said neutral axis having a pair of manifold ports and on the other side of said axis a single manifold port, means externally of said pump intercommunicating said pair of ports, valve means selectively communicating either said pair of intercommunicated ports to said first rotating motor or said single manifold port to said oscillating motor and means for rotating said single manifold port and at least one of said pair of manifold ports relative to the neutral axis for varying the output volume of said pump.

38. A hydraulic laundry machine transmission comprised of a housing having an upwardly extending collar having a vertical passage therethrough, a tubular shaft extending downwardly through said passage and rotatably supported by said housing, sealing means adjacent the upper end of said collar engaging the outer surface of said tubular shaft, a hydraulic motor mechanically connected to the lower end of said shaft for rotating same and having a high pressure inlet passage, a second shaft inside of said tubular shaft and extending downwardly therebelow into said housing, a hydraulic motor mechanically connected to the lower end of said second shaft, said tubular shaft having a slight clearance from the inside of said collar and below said sealing means, said second shaft being rotatably journaled in said tubular shaft adjacent its upper end and having a clearance from the inside of said tubular shaft below the upper end thereof and opening past the lower end, a passage through said tubular shaft below said sealing means intercommunicating the clearances, means communicating the high pressure passage of said first-mentioned motor to said clearance between said collar and said shaft and means communicating the clearance between the inner surface of said tubular shaft and said second-mentioned shaft adjacent the lower end to the sump whereby hydraulic fluid under pressure can flow between said collar and tubular shaft and between said tubular shaft and second-mentioned shaft to lubricate and cool same.

39. A hydraulic laundry machine transmission including a housing, a shaft rotatable in said housing and adapted to support an agitator member, a vane type oscillating hydraulic motor having an axis of rotation coaxial with the axis of said shaft, at least one keyway in said shaft, a key in the vane of said motor and radially slidable into and out of said keyway, means biasing said key toward said keyway and means for retracting said key out of said keyway when said vane is rotated by forces on said shaft to a position beyond the normal oscillation arc of said motor.

40. The combination of claim 39 wherein said means comprise a cam surface in said housing and a follower on said key so disposed that when said vane is rotated to said position, said cam engages said follower to withdraw said key from said keyway.

41. A hydraulic laundry machine transmission for a laundry machine including a basket adapted to be rapidly rotated with clothes on the inside thereof, a housing having an upwardly facing bearing surface, a shaft connected to said basket and having a downwardly facing surface at least a portion of which engages said housing surface and forms a thrust bearing, a positive displacement type hydraulic pump, a positive displacement hydraulic motor operatively associated with said shaft and having an inlet, valve means for periodically communicating said inlet with said pump, whereby the hydraulic pressure in said inlet increases substantially above normal due to the inertia of starting the basket with the clothes inside thereof rotating, and means communicating said inlet to at least a portion of said shaft surface whereby said above normal hydraulic pressure exerts an upward force on said shaft to lower the static friction of said thrust bearing when said motor starts to rotate.

42. A hydraulic transmission comprised of a hydraulic pump rotatable in either of two directions and having a pair of fluid ports which are alternately outlet ports under pressure depending upon the direction of rotation of said pump; a first hydraulic motor and a second hydraulic motor, each actuated by fluid pressure; and means sensitive to which outlet port is under pressure for causing the pressure of one of said pump ports when it acts as an outlet port to actuate said first hydraulic motor and for causing the pressure of the other of said pump ports when it is acting as an outlet port to actuate said second hydraulic motor.

43. The transmission of claim 42 wherein means are provided for communicating the sump of said transmission to an inlet port of one of said motors when the outlet port of said pump is communicated to the inlet port of the other motor.

44. A hydraulic transmission comprised of a hydraulic pump rotatable in either of two directions, a reversible electric motor driving said pump, a first hydraulic motor and a second hydraulic motor and valve means having: a first position communicating an outlet of said pump when rotating in one direction to said first motor; and, a second position communicating the pump when rotating in the opposite direction to said second motor; means for shifting said valve means to either of said positions corresponding to the direction of rotation of said pump; and means for reversing said electric motor.

45. A hydraulic transmission comprised of a two-piece housing, each piece having a generally flat surface having a plurality of recesses therein and means holding said surfaces in opposed abutting, sealed relationship, said housing defining a pumping member cavity, a valve member cavity and first and second motor member cavities, a plurality of pumping members in said pumping member cavity, a shaft extending through an opening of said housing into said pumping member cavity for driving said pumping members, a valve member in said valve cavity, said valve cavity and said valve member having surfaces in sliding, sealing engagement and other spaced surfaces defining a plurality of valve passages, said motor cavities each including a plurality of motor members, independent inlet and outlet ports to said pumping member cavity and both of said motor member cavities, said recesses of said housing surfaces including a plurality of passages each communicating independently of the others, an outlet port of said pumping member cavity and at least an inlet port of each of said motor member cavities with appropriate ones of said valve passages, said valve member being movable to selectively direct the flow of hydraulic fluid from said pump to either of said motors.

46. The improvement of claim 45 wherein the valve member cavity is generally elongated in the plane of the surfaces and is defined by: a plurality of longitudinally spaced, semi-cylindrical surfaces with the semi-cylindrical surfaces of each recess being aligned to define a cylindrical valve member sealing surface; and, surfaces of greater diameter between said sealing surfaces defining valve passages, said valve member having a length less than the length of said valve member cavity and having a plurality of longitudinally spaced cylindrical surfaces of a diameter to sealingly and slidingly engage said valve member sealing surfaces and separated by portions of lesser diameter, said valve member being movable to selected positions to communicate selected valve passages.

47. The improvement of claim 46 wherein one port of said pump communicates with one axial end of said valve member and the other port of said pump communicates with the opposite axial end of said valve member whereby depending upon the direction of rotation of said pump, said valve member will be shifted in one axial direction or the other.

48. A hydraulic transmission comprised of:
a two-piece housing, each piece having a generally flat surface with a plurality of recesses therein and means holding said surfaces in abutting sealed relationship;
said housing defining:
a first generally cylindrical recess defining a pumping member cavity,
a second generally cylindrical recess defining a motor cavity; and,
a third recess defining a valve cavity;
said first cavity having a plurality of pumping members therein, a shaft extending through an opening in said housing into said cavity and arranged to drive said pumping members;
said second cavity having a plurality of motor members therein, a shaft extending through an opening in said housing and arranged to be driven by said motor members,
said third cavity having a valve member movable therein, said third cavity and valve member having surfaces in sliding sealing engagement and other spaced surfaces defining valve passages,
said first and second cavities having inlet and outlet ports for hydraulic fluid;
said recesses in said housing surfaces including:
conduits independently communicating the inlet and outlet ports of said first cavity with certain of said third cavity passages and, other conduits communicating other of said third cavity passages with the inlet and outlet ports of said second cavity; and
means for moving said valve member from one position to another whereby to control the flow of hydraulic fluid from said first cavity ports to said second cavity ports.

References Cited by the Examiner

UNITED STATES PATENTS

| | | | |
|---|---|---|---|
| 1,611,895 | 12/1926 | Dienner | 68—23 X |
| 1,932,246 | 10/1933 | Kirby | 68—26 |
| 2,449,634 | 9/1948 | Baade | 68—23 X |
| 2,530,720 | 11/1950 | Paulson | 15—82 |
| 2,574,418 | 11/1951 | Rubano | 68—23 X |
| 2,582,810 | 1/1952 | Wilcox | 60—53 |
| 2,821,840 | 2/1958 | Hays | 68—133 X |

FOREIGN PATENTS 911,731  11/1962  Great Britain.

WILLIAM I. PRICE, *Primary Examiner.*

WALTER A. SCHEEL, *Examiner.*